(12) United States Patent
Kurita

(10) Patent No.: US 9,135,047 B2
(45) Date of Patent: Sep. 15, 2015

(54) APPARATUS, METHOD, AND PROGRAM FOR MANAGING A PLURALITY OF VIRTUAL MACHINES

(75) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 13/602,531

(22) Filed: Sep. 4, 2012

(65) Prior Publication Data

US 2013/0104128 A1 Apr. 25, 2013

(30) Foreign Application Priority Data

Oct. 21, 2011 (JP) ................................ 2011-231699

(51) Int. Cl.
*G06F 9/455* (2006.01)
*G06F 9/48* (2006.01)

(52) U.S. Cl.
CPC .......... *G06F 9/45558* (2013.01); *G06F 9/4856* (2013.01); *G06F 9/4862* (2013.01); *G06F 2009/4557* (2013.01)

(58) Field of Classification Search
CPC .. G06F 9/45558; G06F 9/4856; G06F 9/4862
See application file for complete search history.

(56) References Cited

U.S. PATENT DOCUMENTS

| | | | |
|---|---|---|---|
| 7,203,944 B1 * | 4/2007 | van Rietschote et al. | 718/104 |
| 7,716,667 B2 * | 5/2010 | van Rietschote et al. | 718/1 |
| 7,844,713 B2 * | 11/2010 | Ikawa et al. | 709/227 |
| 8,095,929 B1 * | 1/2012 | Ji et al. | 718/1 |
| 8,244,957 B2 * | 8/2012 | Eidus et al. | 711/6 |
| 8,250,574 B2 * | 8/2012 | Baba | 718/1 |
| 8,489,744 B2 * | 7/2013 | Elyashev et al. | 709/226 |
| 8,595,737 B2 * | 11/2013 | Ichikawa et al. | 718/103 |
| 8,826,292 B2 * | 9/2014 | Heim | 718/105 |
| 2010/0017517 A1 | 1/2010 | Arai et al. | |
| 2010/0175070 A1 * | 7/2010 | Baba | 718/105 |

FOREIGN PATENT DOCUMENTS

| | | |
|---|---|---|
| JP | 2004-88200 | 3/2004 |
| JP | 2010-26699 | 2/2010 |
| JP | 2010-140134 | 6/2010 |
| JP | 2011-180889 | 9/2011 |

OTHER PUBLICATIONS

Japanese Office Action dated Mar. 3, 2015 in Patent Application No. 2011-231699.

* cited by examiner

*Primary Examiner* — Van Nguyen
(74) *Attorney, Agent, or Firm* — Staas & Halsey LLP

(57) ABSTRACT

An apparatus includes a memory and a processor that executes a program including a procedure on the memory. The procedure comprises receiving information in which a communication amount corresponding to an amount of transmitted and received data is associated with a transmission source and a destination of the data with respect to each of virtual machines operating in a system including servers, calculating a correlation degree between the transmission source and the destination based on the information, calculating an arrangement candidate of the virtual machine with respect to the server based on the correlation degree, calculating a load on the network in the system imparted by the transmission and reception of the data attributable to a movement of the virtual machine to match the arrangement candidate; and controlling the movement of the virtual machine in accordance with the arrangement candidate based on the load and a threshold.

20 Claims, 35 Drawing Sheets

| VM | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EXTERNAL TRAFFIC AMOUNT (Mbps) | 1 | 2 | 3 | 4 | 5 | 6 | 7 | 8 | 9 | 10 | 11 | 12 | 13 | 14 | 15 | 16 |

FIG. 3

| Src_VM \ Dst_VM | 1 | 2 | 3 | 4 |
|---|---|---|---|---|
| 1 | – | 6 | 4 | 1 |
| 2 | 6 | – | 3 | 5 |
| 3 | 4 | 3 | – | 4 |
| 4 | 1 | 5 | 4 | – |

FIG. 4

| VM | 1 | 2 | 3 | 4 |
|---|---|---|---|---|
| EXTERNAL TRAFFIC AMOUNT [Mbps] | 5 | 6 | 9 | 3 |

FIG. 5

| VM | 1 | 2 | 3 | 4 |
|---|---|---|---|---|
| MOVEMENT COST (Q) | 4 | 2 | 1 | 5 |

FIG. 8

|     | NUMBER OF HOPS FROM GW | PASSING-THROUGH SWITCH 1 | PASSING-THROUGH SWITCH 2 | VIRTUAL SWITCH | ARRANGEMENT MAXIMUM VALUE |
|-----|---|-----|-----|------|---|
| SV1 | 3 | SW3 | SW1 | VSWa | 4 |
| SV2 | 3 | SW3 | SW1 | VSWb | 4 |
| SV3 | 3 | SW3 | SW2 | VSWc | 4 |
| SV4 | 3 | SW3 | SW2 | VSWd | 4 |

FIG. 9

| Src VM | Dst VM | x | y | z |
|--------|--------|---|---|---|
| ... | ... | ... | ... | ... |
| 2 | 1 | 1 | 0.8 | 1 |
| 2 | 3 | 1 | 0.6 | 1 |
| 2 | 4 | 1 | 0.6 | 0.8 |
| ... | ... | ... | ... | ... |

FIG. 10

| Src\Dst | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | – | 15 | 14 | 13 | 12 | 11 | 10 | 9 | 8 | 7 | 6 | 5 | 4 | 3 | 2 | 1 |
| 2 | 15 | – | 14 | 13 | 12 | 11 | 10 | 9 | 8 | 7 | 6 | 5 | 4 | 3 | 2 | 1 |
| 3 | 14 | 14 | – | 13 | 12 | 11 | 10 | 9 | 8 | 7 | 6 | 5 | 4 | 3 | 2 | 1 |
| 4 | 13 | 13 | 13 | – | 12 | 11 | 10 | 9 | 8 | 7 | 6 | 5 | 4 | 3 | 2 | 1 |
| 5 | 12 | 12 | 12 | 12 | – | 11 | 10 | 9 | 8 | 7 | 6 | 5 | 4 | 3 | 2 | 1 |
| 6 | 11 | 11 | 11 | 11 | 11 | – | 10 | 9 | 8 | 7 | 6 | 5 | 4 | 3 | 2 | 1 |
| 7 | 10 | 10 | 10 | 10 | 10 | 10 | – | 9 | 8 | 7 | 6 | 5 | 4 | 3 | 2 | 1 |
| 8 | 9 | 9 | 9 | 9 | 9 | 9 | 9 | – | 8 | 7 | 6 | 5 | 4 | 3 | 2 | 1 |
| 9 | 8 | 8 | 8 | 8 | 8 | 8 | 8 | 8 | – | 7 | 6 | 5 | 4 | 3 | 2 | 1 |
| 10 | 7 | 7 | 7 | 7 | 7 | 7 | 7 | 7 | 7 | – | 6 | 5 | 4 | 3 | 2 | 1 |
| 11 | 6 | 6 | 6 | 6 | 6 | 6 | 6 | 6 | 6 | 6 | – | 5 | 4 | 3 | 2 | 1 |
| 12 | 5 | 5 | 5 | 5 | 5 | 5 | 5 | 5 | 5 | 5 | 5 | – | 4 | 3 | 2 | 1 |
| 13 | 4 | 4 | 4 | 4 | 4 | 4 | 4 | 4 | 4 | 4 | 4 | 4 | – | 3 | 2 | 1 |
| 14 | 3 | 3 | 3 | 3 | 3 | 3 | 3 | 3 | 3 | 3 | 3 | 3 | 3 | – | 2 | 1 |
| 15 | 2 | 2 | 2 | 2 | 2 | 2 | 2 | 2 | 2 | 2 | 2 | 2 | 2 | 2 | – | 1 |
| 16 | 1 | 1 | 1 | 1 | 1 | 1 | 1 | 1 | 1 | 1 | 1 | 1 | 1 | 1 | 1 | – |

FIG. 12

| Src \ Dst | 1+2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 1+2 | – | 28 | 26 | 24 | 22 | 20 | 18 | 16 | 14 | 12 | 10 | 8 | 6 | 4 | 2 |
| 3 | 28 | – | 13 | 12 | 11 | 10 | 9 | 8 | 7 | 6 | 5 | 4 | 3 | 2 | 1 |
| 4 | 26 | 13 | – | 12 | 11 | 10 | 9 | 8 | 7 | 6 | 5 | 4 | 3 | 2 | 1 |
| 5 | 24 | 12 | 12 | – | 11 | 10 | 9 | 8 | 7 | 6 | 5 | 4 | 3 | 2 | 1 |
| 6 | 22 | 11 | 11 | 11 | – | 10 | 9 | 8 | 7 | 6 | 5 | 4 | 3 | 2 | 1 |
| 7 | 20 | 10 | 10 | 10 | 10 | – | 9 | 8 | 7 | 6 | 5 | 4 | 3 | 2 | 1 |
| 8 | 18 | 9 | 9 | 9 | 9 | 9 | – | 8 | 7 | 6 | 5 | 4 | 3 | 2 | 1 |
| 9 | 16 | 8 | 8 | 8 | 8 | 8 | 8 | – | 7 | 6 | 5 | 4 | 3 | 2 | 1 |
| 10 | 14 | 7 | 7 | 7 | 7 | 7 | 7 | 7 | – | 6 | 5 | 4 | 3 | 2 | 1 |
| 11 | 12 | 6 | 6 | 6 | 6 | 6 | 6 | 6 | 6 | – | 5 | 4 | 3 | 2 | 1 |
| 12 | 10 | 5 | 5 | 5 | 5 | 5 | 5 | 5 | 5 | 5 | – | 4 | 3 | 2 | 1 |
| 13 | 8 | 4 | 4 | 4 | 4 | 4 | 4 | 4 | 4 | 4 | 4 | – | 3 | 2 | 1 |
| 14 | 6 | 3 | 3 | 3 | 3 | 3 | 3 | 3 | 3 | 3 | 3 | 3 | – | 2 | 1 |
| 15 | 4 | 2 | 2 | 2 | 2 | 2 | 2 | 2 | 2 | 2 | 2 | 2 | 2 | – | 1 |
| 16 | 2 | 1 | 1 | 1 | 1 | 1 | 1 | 1 | 1 | 1 | 1 | 1 | 1 | 1 | – |

FIG. 13A

| Src \ Dst | 1+2+3 | 4 | 5 | 6 | 7 | 8 | 9 | 10 | 11 | 12 | 13 | 14 | 15 | 16 |
|---|---|---|---|---|---|---|---|---|---|---|---|---|---|---|
| 1+2+3 |  | 39 | 36 | 33 | 30 | 27 | 24 | 21 | 18 | 15 | 12 | 9 | 6 | 3 |
| 4 | 39 |  | 12 | 11 | 10 | 9 | 8 | 7 | 6 | 5 | 4 | 3 | 2 | 1 |
| 5 | 36 | 12 |  | 11 | 10 | 9 | 8 | 7 | 6 | 5 | 4 | 3 | 2 | 1 |
| 6 | 33 | 11 | 11 |  | 10 | 9 | 8 | 7 | 6 | 5 | 4 | 3 | 2 | 1 |
| 7 | 30 | 10 | 10 | 10 |  | 9 | 8 | 7 | 6 | 5 | 4 | 3 | 2 | 1 |
| 8 | 27 | 9 | 9 | 9 | 9 |  | 8 | 7 | 6 | 5 | 4 | 3 | 2 | 1 |
| 9 | 24 | 8 | 8 | 8 | 8 | 8 |  | 7 | 6 | 5 | 4 | 3 | 2 | 1 |
| 10 | 21 | 7 | 7 | 7 | 7 | 7 | 7 |  | 6 | 5 | 4 | 3 | 2 | 1 |
| 11 | 18 | 6 | 6 | 6 | 6 | 6 | 6 | 6 |  | 5 | 4 | 3 | 2 | 1 |
| 12 | 15 | 5 | 5 | 5 | 5 | 5 | 5 | 5 | 5 |  | 4 | 3 | 2 | 1 |
| 13 | 12 | 4 | 4 | 4 | 4 | 4 | 4 | 4 | 4 | 4 |  | 3 | 2 | 1 |
| 14 | 9 | 3 | 3 | 3 | 3 | 3 | 3 | 3 | 3 | 3 | 3 |  | 2 | 1 |
| 15 | 6 | 2 | 2 | 2 | 2 | 2 | 2 | 2 | 2 | 2 | 2 | 2 |  | 1 |
| 16 | 3 | 1 | 1 | 1 | 1 | 1 | 1 | 1 | 1 | 1 | 1 | 1 | 1 |  |

FIG. 13B

| Src\Dst | 1+2+3+4 | 5 | 6 | 7 | 8 | 9 | 10 | 11 | 12 | 13 | 14 | 15 | 16 |
|---|---|---|---|---|---|---|---|---|---|---|---|---|---|
| 1+2+3+4 |  | 48 | 44 | 40 | 36 | 32 | 28 | 24 | 20 | 16 | 12 | 8 | 4 |
| 5 | 48 |  | 11 | 10 | 9 | 8 | 7 | 6 | 5 | 4 | 3 | 2 | 1 |
| 6 | 44 | 11 |  | 10 | 9 | 8 | 7 | 6 | 5 | 4 | 3 | 2 | 1 |
| 7 | 40 | 10 | 10 |  | 9 | 8 | 7 | 6 | 5 | 4 | 3 | 2 | 1 |
| 8 | 36 | 9 | 9 | 9 |  | 8 | 7 | 6 | 5 | 4 | 3 | 2 | 1 |
| 9 | 32 | 8 | 8 | 8 | 8 |  | 7 | 6 | 5 | 4 | 3 | 2 | 1 |
| 10 | 28 | 7 | 7 | 7 | 7 | 7 |  | 6 | 5 | 4 | 3 | 2 | 1 |
| 11 | 24 | 6 | 6 | 6 | 6 | 6 | 6 |  | 5 | 4 | 3 | 2 | 1 |
| 12 | 20 | 5 | 5 | 5 | 5 | 5 | 5 | 5 |  | 4 | 3 | 2 | 1 |
| 13 | 16 | 4 | 4 | 4 | 4 | 4 | 4 | 4 | 4 |  | 3 | 2 | 1 |
| 14 | 12 | 3 | 3 | 3 | 3 | 3 | 3 | 3 | 3 | 3 |  | 2 | 1 |
| 15 | 8 | 2 | 2 | 2 | 2 | 2 | 2 | 2 | 2 | 2 | 2 |  | 1 |
| 16 | 4 | 1 | 1 | 1 | 1 | 1 | 1 | 1 | 1 | 1 | 1 | 1 |  |

FIG. 14

| Src \ Dst | 1+2+3+4 | 5+6 | 7 | 8 | 9 | 10 | 11 | 12 | 13 | 14 | 15 | 16 |
|---|---|---|---|---|---|---|---|---|---|---|---|---|
| 1+2+3+4 |  | 92 | 40 | 36 | 32 | 28 | 24 | 20 | 16 | 12 | 8 | 4 |
| 5+6 | 92 |  | 20 | 18 | 16 | 14 | 12 | 10 | 8 | 6 | 4 | 2 |
| 7 | 40 | 20 |  | 9 | 8 | 7 | 6 | 5 | 4 | 3 | 2 | 1 |
| 8 | 36 | 18 | 9 |  | 8 | 7 | 6 | 5 | 4 | 3 | 2 | 1 |
| 9 | 32 | 16 | 8 | 8 |  | 7 | 6 | 5 | 4 | 3 | 2 | 1 |
| 10 | 28 | 14 | 7 | 7 | 7 |  | 6 | 5 | 4 | 3 | 2 | 1 |
| 11 | 24 | 12 | 6 | 6 | 6 | 6 |  | 5 | 4 | 3 | 2 | 1 |
| 12 | 20 | 10 | 5 | 5 | 5 | 5 | 5 |  | 4 | 3 | 2 | 1 |
| 13 | 16 | 8 | 4 | 4 | 4 | 4 | 4 | 4 |  | 3 | 2 | 1 |
| 14 | 12 | 6 | 3 | 3 | 3 | 3 | 3 | 3 | 3 |  | 2 | 1 |
| 15 | 8 | 4 | 2 | 2 | 2 | 2 | 2 | 2 | 2 | 2 |  | 1 |
| 16 | 4 | 2 | 1 | 1 | 1 | 1 | 1 | 1 | 1 | 1 | 1 |  |

FIG. 16

| Src \ Dst | 1+2+3+4 | 5+6+7+8 | 9+10+11+12 | 13+14+15+16 |
|---|---|---|---|---|
| 1+2+3+4 |  | 168 | 104 | 40 |
| 5+6+7+8 | 168 |  | 104 | 40 |
| 9+10+11+12 | 104 | 104 |  | 40 |
| 13+14+15+16 | 40 | 40 | 40 |  |

FIG. 19A

| Src VM | Dst VM | BAND (Mbps) | OCCURRENCE FREQUENCY (TIMES/s) | DURATION (sec) |
|---|---|---|---|---|
| 1 | 2 | 2 | 5 | 10 |
| 1 | 3 | 3 | 4 | 20 |
| 1 | 4 | 4 | 3 | 30 |
| 1 | EXTERNAL PART | 1 | 2 | 40 |
| ... | ... | ... | ... | ... |

FIG. 19B

| VM | MOVEMENT TRAFFIC AMOUNT (Mbps) | DURATION (sec) |
|---|---|---|
| 1 | 10 | 100 |
| 2 | 20 | 90 |
| 3 | 30 | 70 |
| 4 | 40 | 40 |

FIG. 20

| DESTINATION IP (= MANAGEMENT SERVER) | TRANSMISSION SOURCE IP (= NOTIFICATION SERVER) | DATA TYPE | NUMBER OF DATA PIECES (UNIT: PIECE) | DstVM (VM_id) | SrcVM (VM_id) | TRAFFIC (UNIT: Mbps) | ... | DstVM (VM_id) | SrcVM (VM_id) | TRAFFIC (UNIT: Mbps) |
|---|---|---|---|---|---|---|---|---|---|---|
| 192.168.1.1 | 192.168.1.100 | | 8 | 1 | 2 | 5 | ... | 1 | 3 | 10 |
| | | | | DATA#1 | | | | DATA#8 | | |

FIG. 21

| VM | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| COST (Q) | 1 | 2 | 3 | 4 | 5 | 6 | 7 | 8 | 9 | 10 | 11 | 12 | 13 | 14 | 15 | 16 |

FIG. 22B
[PATTERN 5]
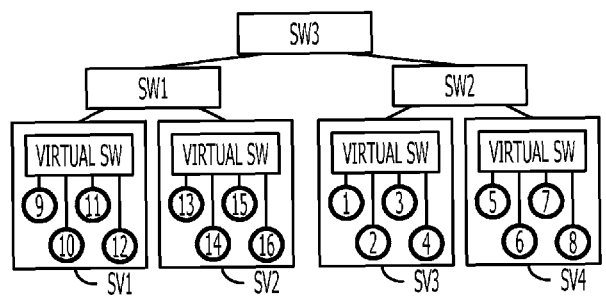
[PATTERN 6]
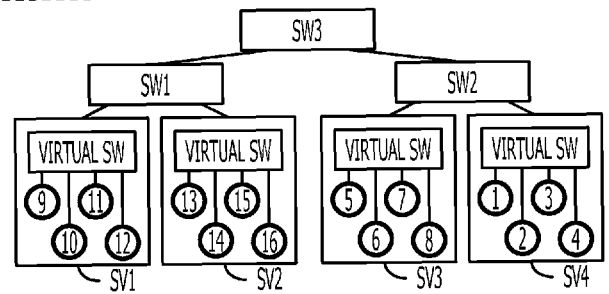
[PATTERN 7]
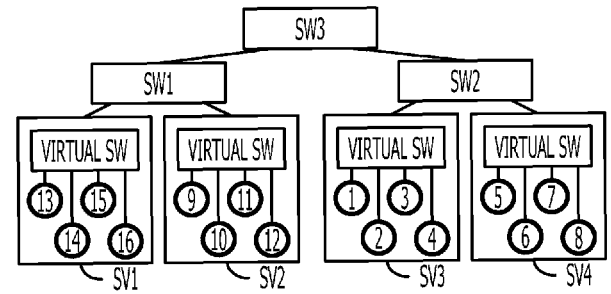
[PATTERN 8]
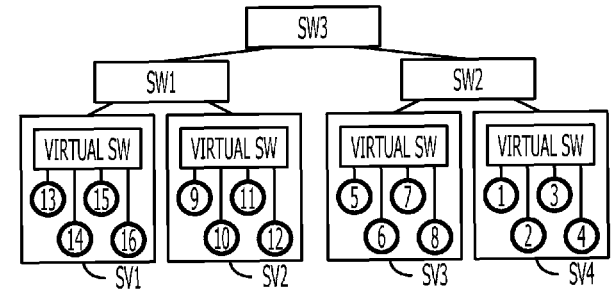

FIG. 23

| PATTERN | 1 | 2 | 3 | 4 | 5 | 6 | 7 | 8 |
|---|---|---|---|---|---|---|---|---|
| TOTAL MOVEMENT COST | 72 | 64 | 95 | 87 | 136 | 136 | 136 | 136 |

FIG. 24

| DESTINATION IP (= MOVEMENT SOURCE SERVER) | TRANSMISSION SOURCE IP (=MANAGEMENT SERVER) | MOVED VM (VM_id) | MOVEMENT DESTINATION SERVER (SERVER_id) |
|---|---|---|---|
| 192.168.1.100 | 192.168.1.1 | VM1 | SV2 |

FIG. 27

| VM | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EXTERNAL TRAFFIC AMOUNT (Mbps) | 1 | 2 | 3 | 4 | 5 | 6 | 7 | 8 | 9 | 10 | 11 | 12 | 13 | 14 | 15 | 16 |

FIG. 30

| IN \ OUT | SERVER SV5 | SERVER SV6 | SERVER SV7 | SERVER SV8 | PHYSICAL SW4 | PHYSICAL SW5 | PHYSICAL SW6 | GW | EXTERNAL NW |
|---|---|---|---|---|---|---|---|---|---|
| SERVER SV5 | | | | | 1 | | | | |
| SERVER SV6 | | | | | | 1 | | | |
| SERVER SV7 | | | | | | 1 | | | |
| SERVER SV8 | | | | | | | | | |
| PHYSICAL SW4 | 1 | | | | | | | 1 | |
| PHYSICAL SW5 | | 1 | 1 | | | | | | |
| PHYSICAL SW6 | | | | | | | | | |
| GW | | | | | 1 | | | | 1 |
| EXTERNAL NW | | | | | | | | 1 | |

FIG. 31

| DESTINATION IP<br>(= SLEEP SERVER) | TRANSMISSION SOURCE IP<br>(= MANAGEMENT SERVER) | REQUEST OPERATION<br>(0 = wake, 1 = sleep) |
|---|---|---|
| 192.168.1.5 | 192.168.1.1 | 1 |

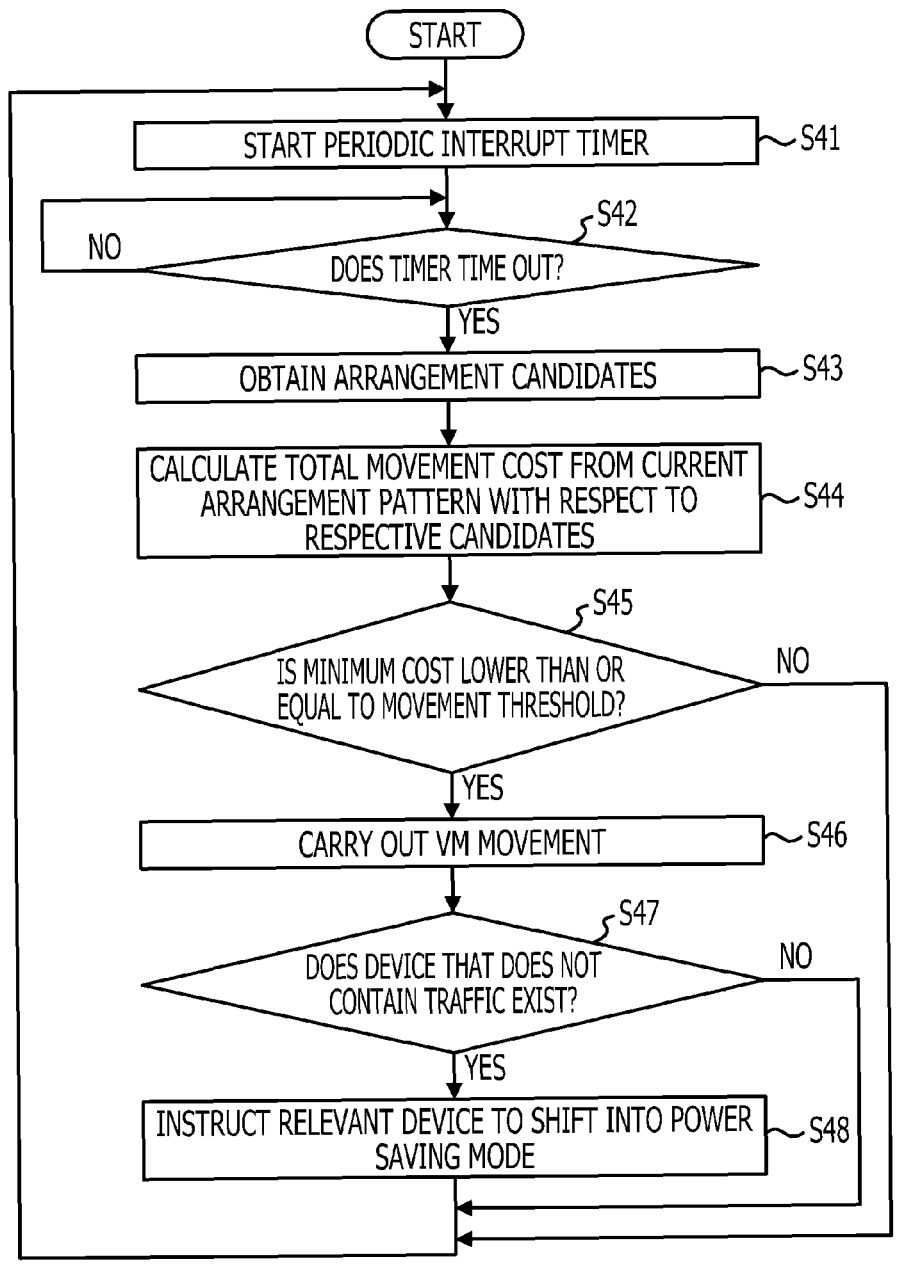

APPARATUS, METHOD, AND PROGRAM FOR MANAGING A PLURALITY OF VIRTUAL MACHINES

CROSS-REFERENCE TO RELATED APPLICATION

This application is based upon and claims the benefit of priority of the prior Japanese Patent Application No. 2011-231699, filed on Oct. 21, 2011, the entire contents of which are incorporated herein by reference.

FIELD

The embodiments discussed herein are related to a communication in a network including plural communication apparatuses.

BACKGROUND

In recent years, cloud computing that uses a network and virtual machines (VM) has been spread. Plural servers are installed in a data center used in the cloud computing in some cases, and the virtual machines operate in the servers. Furthermore, plural virtual machines may also operate in a single server. In a case where the virtual machines are arranged or moved in the data center, for a purpose of facilitating a management or the like, virtual machines used in a same tenant are preferably arranged in a same physical server in some cases. Also, to effectively utilize the physical servers, as many of virtual machines as possible may be arranged in the single physical server. The virtual machine transmits and receives data used for executing an application and an execution result of the application with another virtual machine, the server, or the like. For this reason, communications are established between plural virtual machines in a single data center in some times. Furthermore, a virtual machine operating on a server installed in a data center A may also communication with a virtual machine operating on a server installed in a data center B that is different from the data center A.

As a related art technology, a method of allowing a virtual machine to move between physical servers beyond a network segment is proposed. The method is proposed of efficiently reducing power consumption by preferentially arranging the virtual machines in the physical server where facilities such as air conditioning and illumination are common by using this method. Furthermore, a method is also proposed of deciding, when the number of communications accompanied by at least a certain communication amount between two virtual machines executed by different physical machines exceeds a threshold, an arrangement so that these two virtual machines are executed by a same physical machine. Japanese Laid-open Patent Publication No. 2010-26699 and Japanese Laid-open Patent Publication No. 2010-140134 discuss the related art technologies.

SUMMARY

According to an aspect of the invention, an apparatus includes a memory; and a processor that executes a program including a procedure on the memory. The procedure comprises receiving information in which a communication amount corresponding to an amount of transmitted and received data is associated with a transmission source and a destination of the data with respect to each of a plurality of virtual machines operating in a system including a plurality of servers, calculating a correlation degree between the transmission source and the destination based on the information, calculating an arrangement candidate of the virtual machine with respect to the server based on the correlation degree, calculating a load on the network in the system imparted by the transmission and reception of the data attributable to a movement of the virtual machine to match the arrangement candidate, and controlling the movement of the virtual machine in accordance with the arrangement candidate based on the load and a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a correlation degree table;

FIG. 4 illustrates an example of an external traffic amount table;

FIG. 5 illustrates an example of a movement cost table;

FIG. 8 illustrates an example of network information;

FIG. 9 illustrates an example of initial value data;

FIG. 10 illustrates an example of the correlation degree table;

FIG. 12 illustrates an example of a calculation result of a correlation degree;

FIG. 13A and FIG. 13B illustrate examples of the calculation result of the correlation degree;

FIG. 14 illustrates an example of the calculation result of the correlation degree;

FIG. 16 illustrates an example of correlation degrees between mutual arrangement groups arranged in respective servers;

FIG. 19A and FIG. 19B illustrate examples of a table held by a virtual switch;

FIG. 20 illustrates an example of a format of a notification message;

FIG. 21 illustrates an example of the movement cost table;

FIGS. 22A and 22B illustrates an example of an equivalent arrangement candidate;

FIG. 23 illustrates an example of a value of obtained total movement cost;

FIG. 24 illustrates an example of a format of a movement instruction message;

FIG. 27 illustrates an example of an external traffic amount of virtual machines;

FIG. 30 illustrates an example of a link-by-link traffic table;

FIG. 31 illustrates an example of a format of a power saving instruction message;

FIG. 33 is a flow chart for describing an example of an operation by the management server in operation in the data center.

DESCRIPTION OF EMBODIMENTS

Along with the spread of the cloud computing, since the data amount transmitted and received within the data center and the data amount transmitted and received between the data centers are rapidly increased, a system capable of dealing with the increase in the communication amount is demanded. However, according to the method of by preferentially arranging the virtual machines in the physical server in a particular physical server, the communications established in the data center are not taken into account. For this reason, in a case where the virtual machines are arranged in plural physical servers, depending on the arrangement of the virtual servers, the data amount via the network that connects the physical servers may be increased or the number of relay apparatuses that relay between a transmission source and a destination may be increased. In the above-mentioned case, it is difficult to efficiently utilize lines in the data center. Also, according to the method of deciding the adjustment so that the two virtual machines in which the number of communications accompanied by at least a certain communication amount exceeds the threshold are executed in the same physical machine, the communication generated for changing the arrangement of the virtual servers is not taken into account. For this reason, the processing of moving the virtual server is heavy, and by contrast this may stress the communication in the data center.

According to the present embodiment, it is possible to efficiently utilize the lines in the data center.

Figure 1:
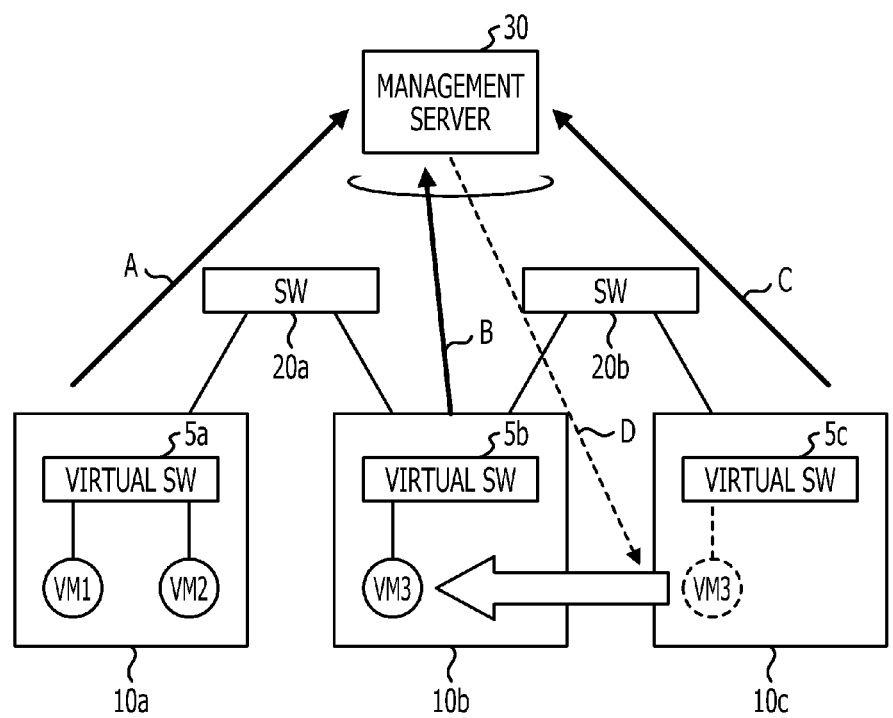
FIG. 1 illustrates an example of a communication method according to an embodiment.

FIG. 1 illustrates an example of a communication method according to an embodiment. Also, FIG. 1 illustrates a data center that is an example of a system in which the communication method according to the present embodiment is executed. In the example of FIG. 1, the data center includes three servers 10 (10a, 10b, and 10c), two switches 20 (20a and 20b), and a management server 30. Plural virtual machines can be installed in the server 10. Herein, first, it is assumed that virtual machines VM1 and VM2 are installed in the server 10a, and a virtual machine VM3 is installed in the server 10c. In each of the servers 10, respective virtual switches 5 (5a, 5b, and 5c) operate. In each of the virtual switches 5, the communication amount of the connected virtual machines is observed while being associated with the transmission source and the destination of data, and the management server 30 is notified of a state of the communication by the virtual machines. For example, with regard to the virtual machines VM1 and VM2, the virtual switch 5a notifies the management server 30 of information indicating the data amount transmitted and received in the communication carried out by each of the virtual machines while being associated with the transmission source and the destination of the data (arrow A). Similarly, the virtual switches 5b and 5c also perform the notification to the management server 30 as represented by arrows B, and C.

The management server 30 calculates a correlation degree between the virtual machines based on the notified information. In the following description, the "correlation degree" is a numeric value representing an index of the communication amount between two virtual machines, and as the correlation degree is higher, the communication amount between the two virtual machines is higher. The management server 30 calculates an arrangement in a case where mutual virtual machines having a large correlation degree are preferably arranged in the same server 10 as an arrangement candidate. Therefore, in the arrangement candidate, it can be also mentioned that an adjustment is made so that a correlation degree between mutual virtual machines VM arranged in different servers is preferably low.

Next, the management server 30 calculates a load (movement load) on the network in the data center by the transmission and reception of the data generated in accordance with the movement of the virtual machines when the virtual machines are arranged as indicated by the obtained arrangement candidate. When the movement load is lower than the threshold, the management server 30 moves the virtual machines in accordance with the arrangement candidate. For example, according to the arrangement candidate, the virtual machines VM1 and VM2 are arranged in the server 10a, and the virtual machine VM3 is arranged in the server 10b. In a case where the movement load is lower than the threshold, the management server 30 moves the virtual machine VM3 from the server 10c to the server 10b by transmitting an instruction message represented by an arrow D to the virtual machine VM3. On the other hand, when the movement load is higher than or equal to the threshold, the management server 30 determines that the load on the network is not suppressed even if the virtual machines are arranged as indicated by the arrangement candidate since the load generated for moving the virtual machines in accordance with the arrangement candidate is large. In view of the above, the management server 30 does not change the arrangement of the virtual machines.

For this reason, by using the method illustrated in FIG. 1, the lines in the data center are efficiently utilized. Furthermore, since the management server 30 performs the movement of the virtual machines after the movement load is compared with the threshold, the situation is avoided in which the communication in the data center is stressed because the processing of moving the virtual servers is too heavy.

<Apparatus Configuration>

Figure 2:
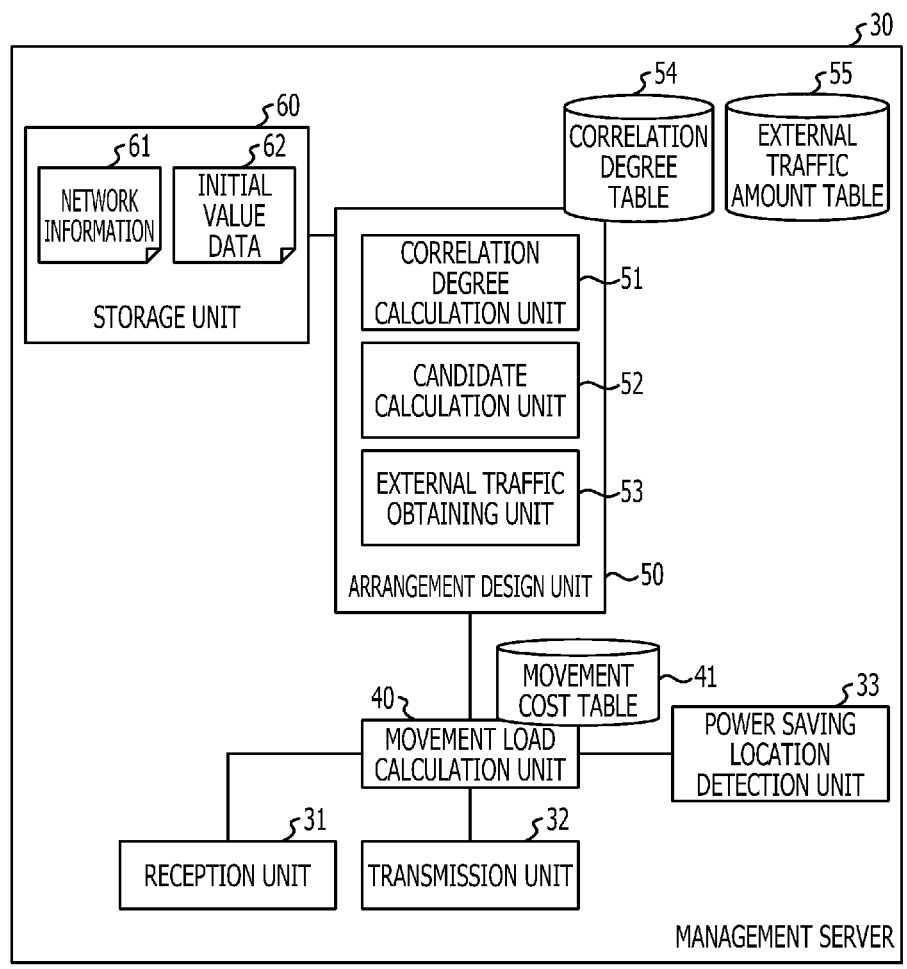
FIG. 2 illustrates an example of a configuration of a management server.

FIG. 2 illustrates an example of a configuration of the management server 30. The management server 30 is provided with a reception unit 31, a transmission unit 32, a movement load calculation unit 40, a movement cost table 41, an arrangement design unit 50, a correlation degree table 54, an external traffic amount table 55, and a storage unit 60. Furthermore, the management server 30 may be provided with the power saving location detection unit 33.

The reception unit 31 receives data and the like transmitted from the server 10. For example, the reception unit 31 receives information used for identifying the amount of data transmitted and received in the communication carried out in the respective virtual machines. In the following description, information used for specifying the amount of data transmitted and received in the communication carried out in the respective virtual machines may be referred to as "traffic information". The traffic information includes information on the communication (external traffic) carried out by the virtual machine with an external communication apparatus located at an external part of the data center other than the information on the communication carried out in the data center.

The transmission unit 32 transmits control information transmitted from the management server 30 to the server 10, data, and the like. For example, the transmission unit 32 transmits a control message for moving the virtual machine to the server 10 where the movement target virtual machine is arranged.

Figure 3:
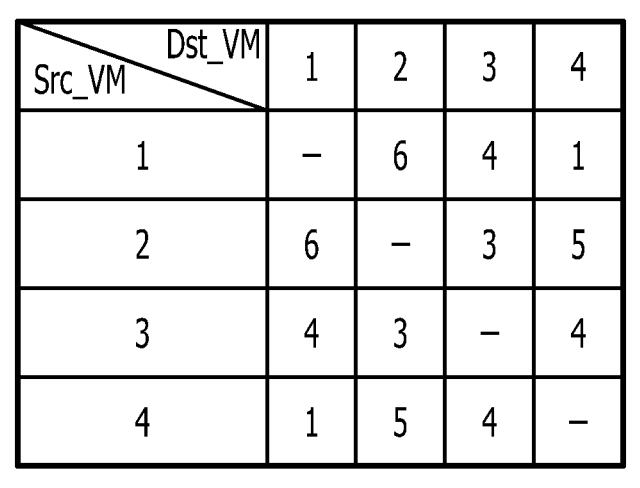

The arrangement design unit 50 is provided with a correlation degree calculation unit 51, a candidate calculation unit 52, and an external traffic obtaining unit 53. The correlation degree calculation unit 51 uses the traffic information obtained from the server 10 to calculate a correlation degree between two virtual machines. In a case where the arrangement of the virtual machines is decided before the operation of the virtual machines is started, the correlation degree calculation unit 51 uses the traffic information recorded in initial value data 62 to calculate a correlation degree. A calculation result of the correlation degree calculation unit 51 is recorded in the correlation degree table 54. FIG. 3 illustrates an example of the correlation degree table 54. FIG. 3 illustrates an example of the correlation degree calculated in a case where four virtual machines VM1 to VM4 operate. A value described in a cell at an intersection of a number of the virtual machine at the transmission source and a number of the virtual machine at the transmission destination is a correlation degree between the virtual machine at the transmission source and the virtual machine at the transmission destination. Therefore, in a case where the virtual machines VM1 to VM4 operate, 12 types of correlation degrees are calculated with regard to the bidirectional communications between VM1 and VM2, between VM1 and VM3, between VM1 and VM4, between VM2 and VM3, between VM2 and VM4, and between VM3 and VM4. A calculation method for the correlation degree will be described in detail below.

The candidate calculation unit 52 calculates an arrangement candidate by using the correlation degree table 54 and network information 61. In the following description, the arrangement candidate is an arrangement in a case where the mutual virtual machines having a high correlation degree are preferably arranged in the same server 10. In a case where the load on the network attributable to the movement of the virtual machines carried out for arranging the virtual machines as indicated by the arrangement candidate is lower than or equal to a certain value, the arrangement candidate may be adopted as the arrangement of the virtual machines. The network information 61 is information for identifying a topology of the network in the data center. The candidate calculation unit 52 identifies a situation of the connection between the servers 10 by the network information 61. The network information 61 includes, for example, information for identifying a switch to which each of the servers 10 is connected, information for identifying the servers 10 included in the same segment, the number of hops from a gateway apparatus with regard to the respective servers 10, and the like. When the arrangement candidate is obtained, the candidate calculation unit 52 sets a configuration so that the mutual virtual machines having a large correlation degree are preferably arranged in the same server 10, and even in a case where the mutual virtual machines having the large correlation degree are not arranged in the same server 10, the mutual virtual machines are preferably arranged in the server 10 in the same segment. The operation by the candidate calculation unit 52 will be described in detail below.

Figure 4:
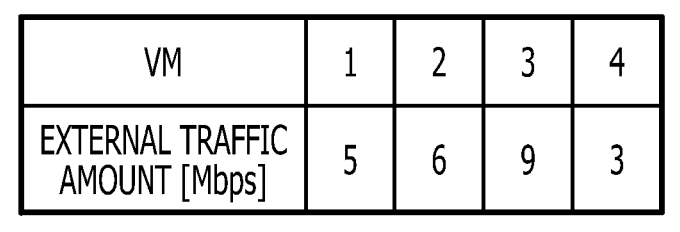

The external traffic obtaining unit 53 extracts the external traffic amounts of the respective virtual machines from the traffic information received via the reception unit 31 from the server 10 and records the obtained value in the external traffic amount table 55. Hereinafter, the amount of data per unit time which flows on the network is referred to as "traffic" in some cases. Also, in the following description, the amount of data per second which flows on a particular line is represented by using bps (Bits Per Second). FIG. 4 illustrates an example of the external traffic amount table 55.

Figure 5:
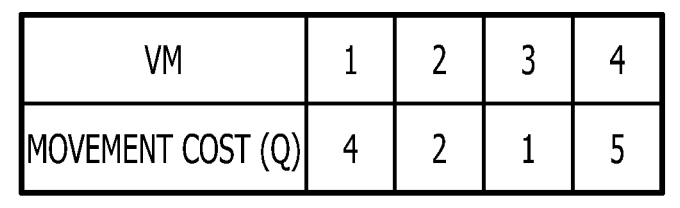

The movement load calculation unit 40 stores the current arrangement situation of the virtual machines. The movement load calculation unit 40 compares the arrangement candidate obtained by the candidate calculation unit 52 with the current arrangement situation of the virtual machines to identify the virtual machines to be moved for arranging the virtual machines in accordance with the arrangement candidate. The movement load calculation unit 40 calculates a movement cost representing the load on the network generated by the movement of the virtual machines with regard to each of the virtual machines to be moved for changing the arrangement in accordance with the arrangement candidate. A calculation method for the movement cost will be described below. It is noted that a situation where the value of the movement cost is high indicates that the load on the network is high when the virtual machines are moved. The movement load calculation unit 40 records the obtained movement cost in the movement cost table 41. FIG. 5 illustrates an example of the movement cost table 41. The movement load calculation unit 40 obtains a movement load (total movement cost) corresponding to a total sum of the movement costs for each arrangement candidate. Furthermore, the movement load calculation unit 40 previously stores the movement threshold and decides the arrangement of the virtual machines as indicated by the arrangement candidate in a case where the obtained movement load is lower than the movement threshold. It is noted that in a case where the movement load is lower than or equal to the movement threshold, the movement load calculation unit 40 may be set to adopt the arrangement candidate. It is noted that the movement threshold is set as a value at which the traffic in the network that can be reduced by changing the arrangement of the virtual machines in accordance with the arrangement candidate is higher than the traffic generated by moving the virtual machines.

The power saving location detection unit 33 detects the server 10 where the virtual machines are not arranged as a target to be set in a power saving mode. In the following description, the server 10 where the virtual machines are not arranged is referred to as "the power saving server" in some cases. In addition, the power saving location detection unit 33 also detects the switch 20 that does not perform the data relay to any of the servers 10 as a target where the power consumption is suppressed. The power saving location detection unit 33 generates a power saving instruction message for demanding a setting on the power consumption of the power saving server and the switch 20 that does not relay the data to be the power saving mode. The transmission unit 32 transmits the power saving instruction message to the destination. It is noted that the power saving mode may be any arbitrary mode so long as the power consumption amount is reduced. For example, the power saving mode may be a sleep mode, a hibernation mode, or the like. Also, a state of the reduced power consumption by carrying out a parameter control in accordance with a traffic in the server 10 or the switch 20 having a DVS (Dynamic Voltage Scaling)/ALR (Adaptive Link Rate) function is also included in the power saving mode.

The storage unit 60 appropriately stores the data obtained through the processing in the management server 30 and the like as well as the network information 61 and the initial value data 62. Also, the current arrangement situation of the virtual machines may be recorded in the storage unit 60, and in that case, the movement load calculation unit 40 obtains the arrangement situation from the storage unit 60 at the time of the calculation for the movement cost.

Figure 6:
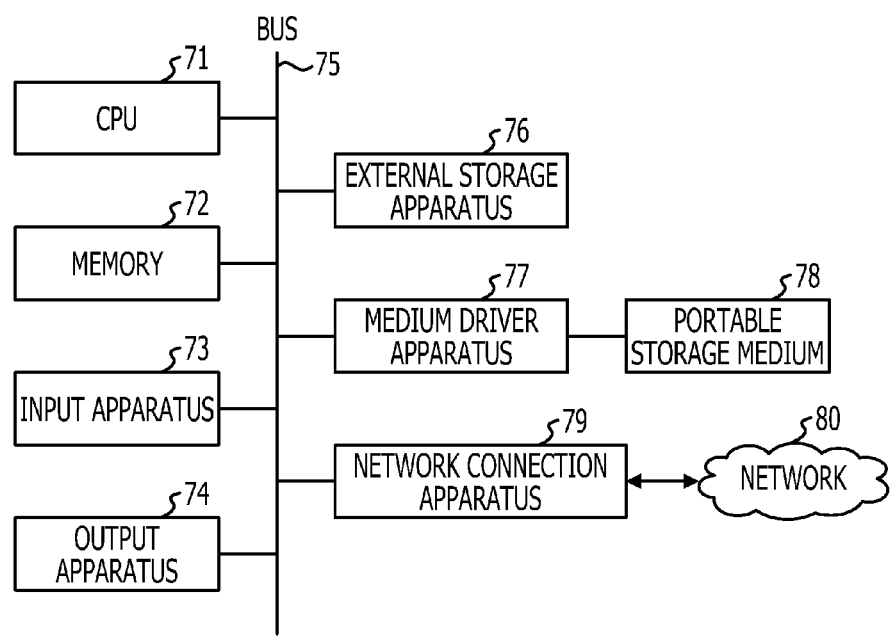
FIG. 6 illustrates an example of a hardware configuration of a server and the management server.

FIG. 6 illustrates an example of hardware of a configuration of the server 10 and the management server 30. The server 10 and the management server 30 are all provided with a Central Processing Unit (CPU) 71, a memory 72, an input apparatus 73, an output apparatus 74, a bus 75, an external storage apparatus 76, a medium driver apparatus 77, and a network connection apparatus 79. The CPU 71 is an example of a processor. For example, the server 10 and the management server 30 may all be realized by a computer in some cases.

In the management server 30, the CPU 71 functions as the movement load calculation unit 40, the arrangement design unit 50, and the power saving location detection unit 33 by executing a program. The memory 72 operates as the storage unit 60 and also stores the movement cost table 41, the correlation degree table 54, and the external traffic amount table 55. Also, the management server 30 may obtain the data such as the network information 61 and the initial value data 62 from the network 80 or a portable storage medium 78. The network connection apparatus 79 functions as the reception unit 31 and the transmission unit 32.

On the other hand, in the server 10, the CPU 71 functions as the virtual switch 5 or the virtual machine. Also, the network connection apparatus 79 functions as an interface when a communication is carried out with the other server 10 or management server 30.

The input apparatus 73 is, for example, a button, a key board, a mouse, or the like, and an operator may use the input apparatus 73 to input the network information 61 or the initial value data 62 to the management server 30. The output apparatus 74 is realized as a display or the like. The bus 75 is used for establishing a connection between the CPU 71, the memory 72, the input apparatus 73, the output apparatus 74, the external storage apparatus 76, the medium driver apparatus 77, and the network connection apparatus 79 so that the data can be transmitted and received mutually. The external storage apparatus 76 stores the data, the program, and the like and appropriately provides the stored information to the CPU 71 or the like. The medium driver apparatus 77 outputs the data in the memory 72 and the external storage apparatus 76 to the portable storage medium 78 and also reads out the data, the program, and the like from the portable storage medium 78. Herein, the portable storage medium 78 includes a flexible disc, a Magneto-Optical (MO) disc, a Compact Disc (CD), and a Digital Versatile Disk (DVD) and may be any storage medium that is portable.

First Embodiment

Figure 7:
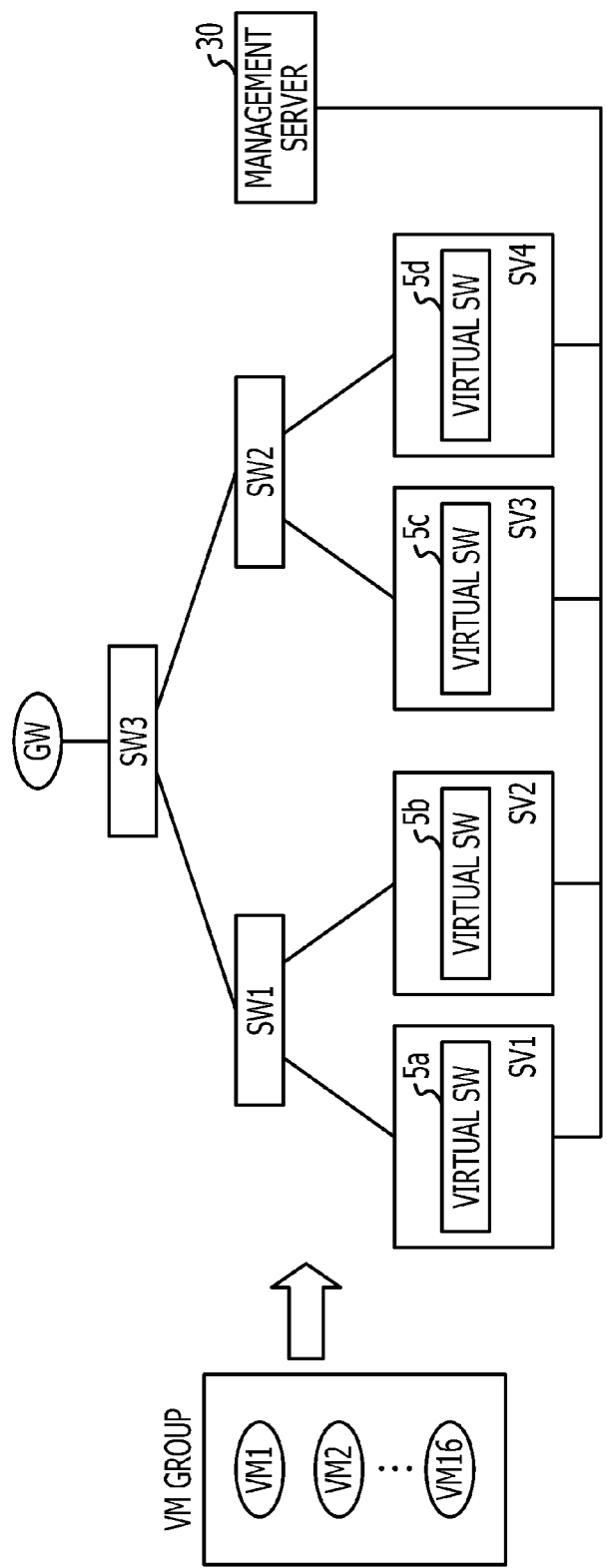
FIG. 7 illustrates an example of a network in a data center.

FIG. 7 illustrates an example of the network in the data center. The network illustrated in FIG. 7 includes the three switches 20 of SW1 to SW3 and the four servers 10 of SV1 to SV4. The SV1 and the SV2 are connected to the SW1, and the SV3 and the SV4 are connected to the SW2. Furthermore, the SW3 is set to be connected to the SW1, the SW2, the gateway (GW).

FIG. 8 illustrates an example of the network information 61. FIG. 8 illustrates an example of the network information 61 held by the management server 30 included in the network of FIG. 7. In the network information 61, with regard to the respective servers 10, the number of hops when the gateway is set as the starting point and the switch 20 through which the route passes from the gateway to the server 10 is recorded. The candidate calculation unit 52 determined that the mutual servers 10 having a marched combination of the passing-through switches 20 are the mutual servers 10 located in the same segment like, for example, the SV1 and the SV2. Furthermore, the network information 61 includes information on a maximum number (arrangement maximum value) of the virtual machines operable in the respective servers 10, the virtual switches operated in the respective servers 10, and the like. In the example of FIG. 8, up to four virtual machines can be arranged in any of the servers 10 of SV1 to SV4. Furthermore, the network information 61 may include address information allocated to the respective servers 10.

Hereinafter, the operation carried out according to the first embodiment in the network illustrated in FIG. 7 will be described while being divided into an operation in a case where a decision on the arrangement before the operation start is carried out, a monitoring on an operation situation, a recalculation for the arrangement candidate, and an operation carried out for changing the arrangement of the virtual machines. In the following example, a case will be described in which 16 virtual machines VM1 to VM16 are arranged.

[Decision on the Arrangement Before the Operation Start]

First, the correlation degree calculation unit 51 obtains a correlation degree between the mutual virtual machines by using the traffic information included in the initial value data 62. A correlation degree P is obtained from the following expression.

$$P = a \times x + b \times y + c \times z$$

Where a, b, and c are coefficients and are values previously stored in the correlation degree calculation unit 51. Also, x is a band parameter, y is a frequency parameter, and z is a duration parameter. The band parameter (x) is a normalized value obtained by dividing a value of a band (bps) X used for the communication carried out in the individual virtual machines by a maximum value Xmax of the band used for the communication. That is, x=X/Xmax is established, and x takes a value between 0 and 1.

Figure 9:
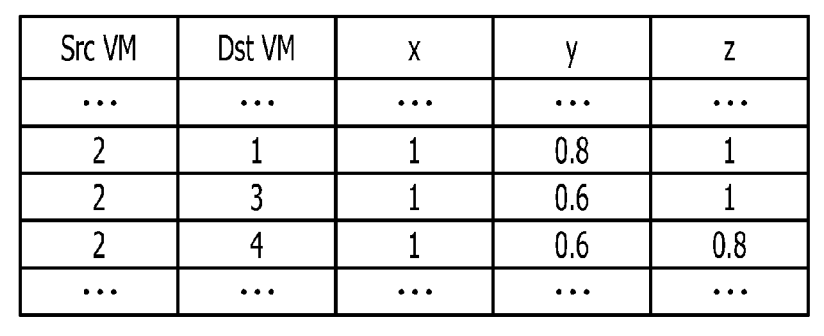

The frequency parameter y is a normalized value (y=Y/Ymax) obtained by obtaining the number Y of occurrences generated per unit time for the individual communications and dividing Y by a maximum value (Ymax) of the obtained Y. Also, the duration parameter z is a normalized value (z=Z/Zmax) by obtaining an average value Z of the durations for the individual communications and dividing Z by a maximum value (Zmax) of the obtained Z. Therefore, y and z also take a value between 0 and 1. The values of x, y, and z before the operation of the virtual machines is started may be estimated through a calculation based on empirical rules by the operator and also may be calculated based on measured values obtained by a simple exploratory experiment. FIG. 9 illustrates an example of the initial value data 62. In the table of FIG. 9, the parameters x, y, and z are recorded while being associated with the virtual machine at the transmission source (SrcVM) and the virtual machine at the transmission destination (DstVM).

The values of the coefficients a, b, and c may be arbitrarily set in accordance with the implementation or based on the empirical rules by the operator so that an influence of the prioritized parameter is enhanced. For example, in a case where the correlation degree is obtained while an emphasis is placed on the influence caused by the band used for the communication, the values of the coefficients are set in some cases as a=1, b=0, and c=0. Also, the operator may set the respective parameters as values at which a scale of the influence imparting, for example, on a monetary value is reflected. It is noted that the magnitude of the parameter calculated by being multiplied by the coefficient having the value of 0 is not taken into account in the calculation for the correlation degree.

For example, the values of the coefficient of the communication band (a), the coefficient of the occurrence frequency of the communications (b), and the coefficient of the duration of the communication (c) are respectively set as a=6, b=5, and c=5. In this case, the correlation degree calculation unit 51 calculates the correlation degree $P_{2-1}$ between the VM1 and the VM2 as follows.

$$P_{2-1} = a \times x + b \times y + c \times z = 6 \times 1 + 5 \times 0.8 + 5 \times 1 = 15.$$

It is noted that a first number of suffixes for P represents a number the virtual machine at the transmission source, and a number after the hyphen represents a number of the virtual machine at the transmission destination. Similarly, the correlation degree calculation unit 51 also calculates the correlation degree with regard to combinations of the other virtual machines to be recorded in the correlation degree table 54. FIG. 10 illustrates an example of the correlation degree table 54.

Next, an example of the calculation method for the arrangement candidate will be described. When the calculation for the correlation degree is ended, the candidate calculation unit 52 calculates the arrangement candidate in the following procedure. Before the operation is started, the arrangement of the virtual machines is not carried out, and therefore the movement of the virtual machines does not occur. For this reason, the virtual machines are arranged in accordance with the calculated arrangement candidate.

Figure 11A:
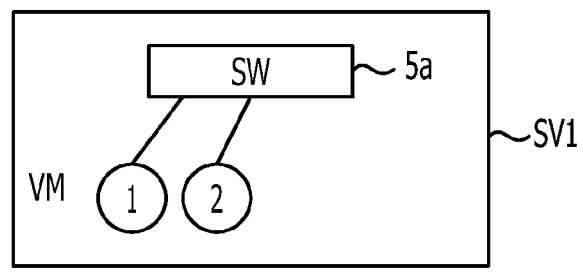
FIG. 11A, FIG. 11B, and FIG. 11C illustrate examples of a virtual machine arrangement method.

(1) The candidate calculation unit 52 refers to the correlation degree table 54 and extracts a combination of the virtual machines having the highest correlation degree to be arranged in the one server 10 in the network. For example, in the example of FIG. 10, the correlation degree $P_{1-2}$ between the VM1 and the VM2 is 15 and higher than the correlation degrees obtained with regard to the combinations of the other virtual machines. In view of the above, the candidate calculation unit 52 arranges the VM1 and the VM2 in the one server 10 selected from the SV1 to the SV4. In the example of FIG. 11A, the VM1 and the VM2 are arranged in the SV1.

(2) The candidate calculation unit 52 regards the two virtual machines arranged in the procedure (1) as one group (arrangement group) and obtains a correlation degree between the arrangement group and the virtual machine that is not arranged. Herein, the correlation degree between the arrangement group when a certain virtual machine is set as the destination and the virtual machine is a total sum of the correlation degrees when each of the virtual machines included in the arrangement group as the transmission source communicates with the virtual machine at the transmission destination. On the other hand, the correlation degree between the arrangement group and the virtual machine when a certain virtual machine is set as the transmission source is a total sum of the correlation degrees when the virtual machine at the transmission source communicates with each of the virtual machines included in the arrangement group. For example, in the case of FIG. 11A, the VM1 and the VM2 are the arrangement group. In view of the above, the candidate calculation unit 52 sets the correlation degree between the VM3 and the arrangement group in a case where the virtual machines included in the arrangement group are set as the transmission source and VM3 is set as the destination as $P_{1-3} + P_{2-3} = 14 + 14 = 28$ by using the values of FIG. 10. FIG. 12 illustrates an example of a calculation result for the correlation degree between the arrangement group and the virtual machines that are not arranged. In the example of FIG. 12, the arrangement group includes the VM1 and the VM2.

Figure 11B:
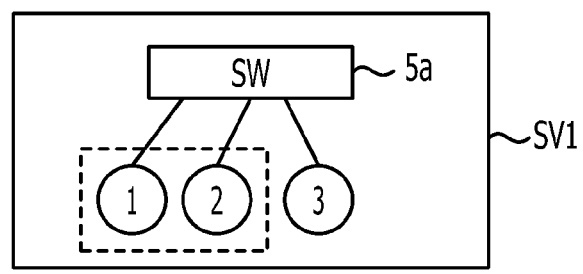

(3) In a case where a new virtual machine can be arranged in the server 10 where the arrangement group is arranged, the candidate calculation unit 52 arranges the virtual machine having the highest correlation degree with the arrangement group in the server 10 that is the same as the arrangement group. In this example, since four virtual machines can be arranged in the SV1, the candidate calculation unit 52 arranges the VM3 in the SV1 as illustrated in FIG. 11B.

(4) When the new virtual machine is arranged, the arranged virtual machine is added to the arrangement group, and the correlation degree between the arrangement group and the virtual machine that is not arranged is obtained. The calculation method is similar to the procedure (2). For example, by using the values of FIG. 10, the correlation degree between the VM4 in a case where the VM4 is set as the destination and the arrangement group is $P_{1-4} + P_{2-4} + P_{3-4} = 13 + 13 + 13 = 39$. FIG. 13A illustrates an example of the calculation result for the correlation degree between the arrangement group and the virtual machine that is not arranged.

Figure 11C:
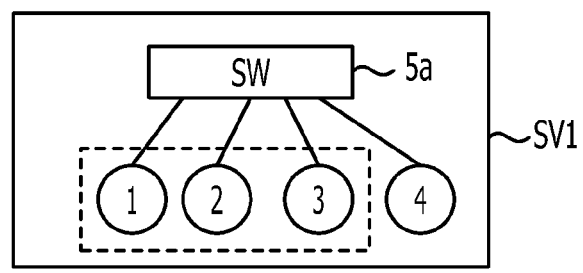

(5) A processing similar to the processing in the procedures (3) and (4) is repeatedly carried out until no more virtual machine is arranged in the server 10 where the arrangement group is arranged. Herein, as illustrated in FIG. 11C, the VM4 is arranged in the SV1. Furthermore, the correlation degree between the arrangement group and the virtual machine that is not arranged is obtained as represented by FIG. 13B.

(6) When no more virtual machine is arranged in the server 10 where the arrangement group is arranged, the candidate calculation unit 52 arranges the virtual machine having the highest correlation degree with the arrangement group in a server preferably having the smallest number of hops from the server where the arrangement group is arranged. At this time, the candidate calculation unit 52 checks the network information 61 and preferentially arranges the virtual machine in the server 10 arranged in the same segment as the server 10 where the arrangement group is arranged. In the example of FIG. 13B, the correlation degree between the arrangement group and the virtual machine VM5 is highest. Furthermore, as illustrated in FIG. 7 and FIG. 8, the server SV2 exists in the same segment as the server SV1 where the arrangement group is arranged, and the arrangement of the virtual machines can be conducted in the server SV2. In view of the above, the candidate calculation unit 52 arranges the virtual machine VM5 in the server SV2.

(7) The candidate calculation unit 52 arranges the virtual machine having the highest correlation degree with the virtual machine arranged in the procedure (6) in the server 10 where the virtual machine is arranged in the procedure (6). In the example of FIG. 13B, the virtual machine having the maximum correlation degree with the VM5 among the virtual machines that are not arranged is the VM6. In view of the above, the candidate calculation unit 52 arranges the virtual machine VM6 in the server SV2. The candidate calculation unit 52 calculates the correlation degree between the arrangement group arranged in the server SV2 and the virtual machine that is not arranged similarly as in the procedure (2). Also, the correlation degree between the arrangement group arranged in the server SV1 and the arrangement group arranged in the server SV2 is also obtained. The correlation degree between the arrangement group arranged in the server SV1 which is set as the transmission source and the arrangement group arranged in the server SV2 which is set as the destination is represented as follows.

$$P_{1-5}+P_{2-5}+P_{3-5}+P_{4-5}+P_{1-6}+P_{2-6}+P_{3-6}+P_{4-6}=12+12+12+12+11+11+11+11=92$$

(8) The candidate calculation unit 52 further repeatedly performs a processing similar to the processing in the procedures (3) and (4) until no more virtual machine is arranged in the server 10 where the virtual machine is arranged. Also, when no more virtual machine is arranged in the server 10 where the virtual machine is arranged, a processing similar to the processing in the procedures (6) and (7) is carried out. The following result is obtained The virtual machines arranged in the server SV1: VM1 to VM4

The virtual machines arranged in the server SV2: VM5 to VM8

The virtual machines arranged in the server SV3: VM9 to VM12

The virtual machines arranged in the server SV4: VM13 to VM16.

Figure 15:
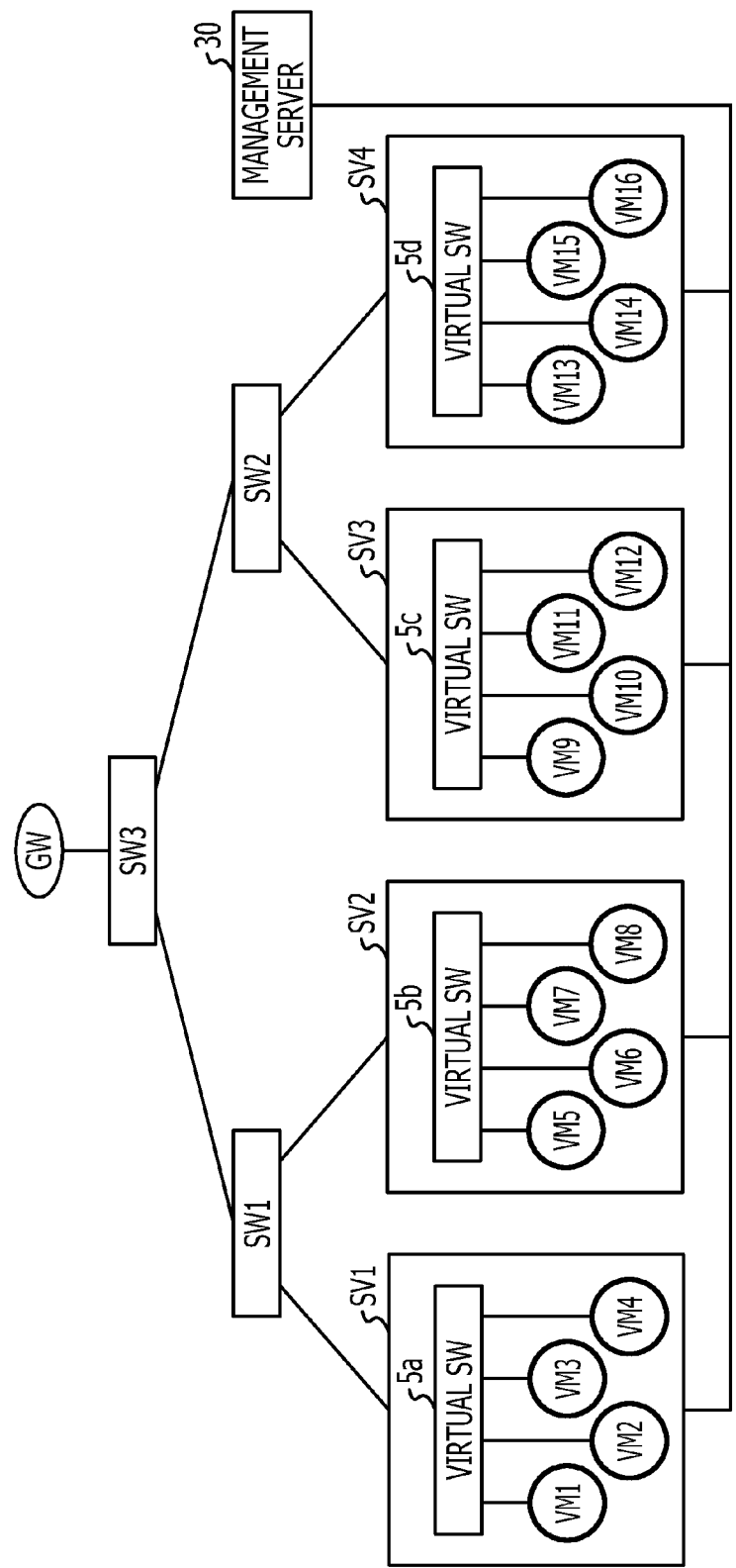
FIG. 15 illustrates an example of an arrangement of the virtual machines.

FIG. 15 illustrates an arrangement of the virtual machines VM1 to VM16. At this time, the correlation degrees of the mutual arrangement groups arranged in the respective servers are as illustrated in FIG. 16. From FIG. 15 and FIG. 16, with the method according to the present embodiment, the arrangement is conducted so that the mutual arrangement groups having the high correlation degree are preferably arranged in the same segment.

The method described in the procedures (1) to (8) is one of the calculation methods for the arrangement candidate, and the calculation method for the arrangement candidate may be changed in accordance with the implementation. For example, in the description of the procedures (1) to (8), the external traffic amount is not taken into account, but in a case where plural combinations of the virtual machines having the same correlation degree exist, the virtual machines having a high external traffic amount may preferentially be arranged. In this case, the operator previously predicts the traffic amount to the external part to be input to the initial value data 62.

Figure 17:
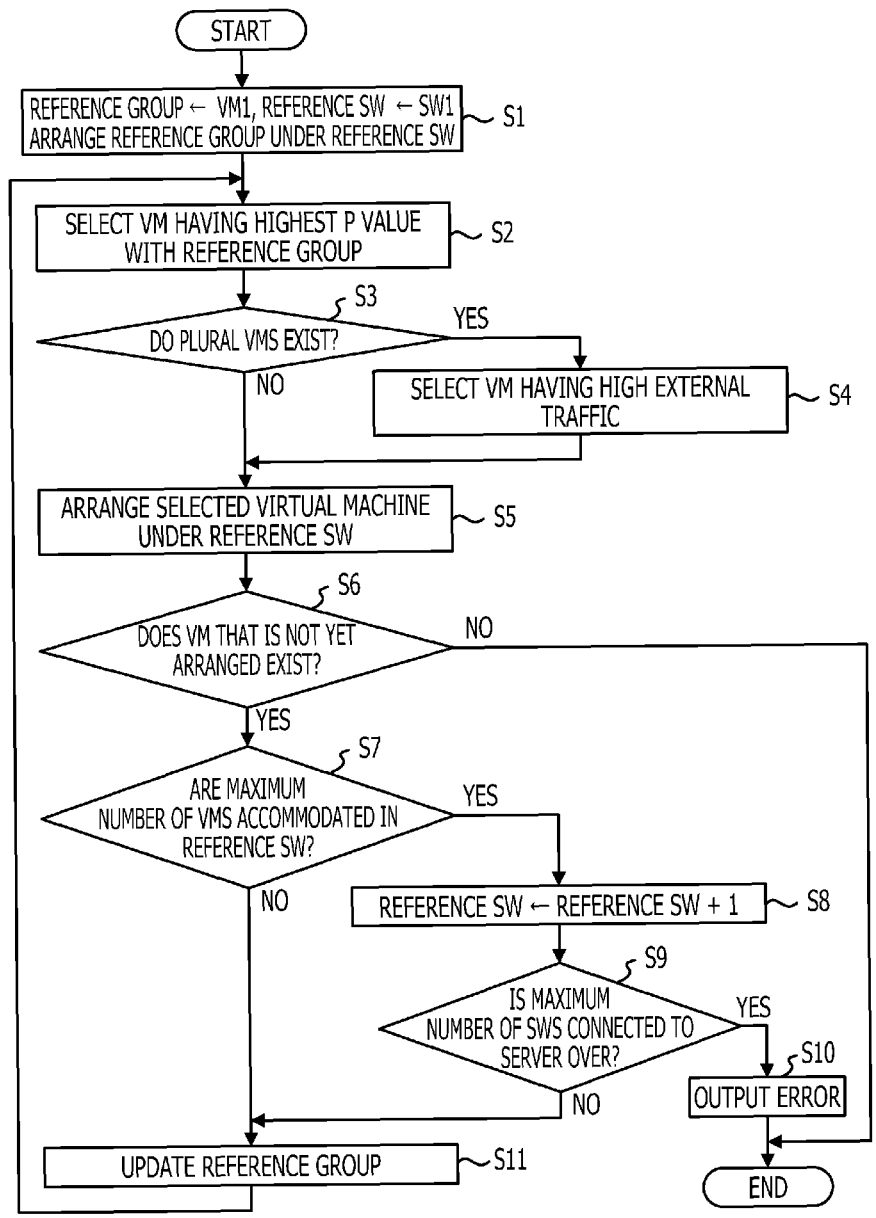
FIG. 17 is a flow chart for describing an example of a calculation method for the arrangement candidate.

FIG. 17 is a flow chart for describing an example of the calculation method for the arrangement candidate. In the example of FIG. 17, the arrangement group in which the new virtual machine can be added is referred to as "reference group". Also, according to the method illustrated in FIG. 17, the candidate calculation unit 52 sets one virtual machine selected through an arbitrary method as a first member of the reference group and decides an arrangement in sequence from the virtual machine having a larger correlation degree with the reference group. It is noted that the example of FIG. 17 illustrates a method used in a case where with regard to a number of the switch 20, the switch 20 connected to the server 10 is set to have a lower number than the switch 20 that is not connected to the server 10 but connects the mutual switches 20.

First, the candidate calculation unit 52 decides a member of the reference group and a reference switch and arranges the reference group in the server connected to the reference switch (operation S1). Herein, the candidate calculation unit 52 sets the virtual machine the assigned number of which is lowest as a first member of the reference group and the switch 20 the assigned number of which is lowest as the reference switch. The candidate calculation unit 52 selects the virtual machine having the highest correlation degree (P) with the reference group (operation S2). In a case where the plural virtual machines having the maximum correlation degree with the reference group exist, the candidate calculation unit 52 selects the virtual machine having the higher external traffic amount (operation S3; Yes, operation S4). On the other hand, in a case where one virtual machine having the maximum correlation degree with the reference group exists, the processing in operation S4 is not carried out (operation S3; No). The candidate calculation unit 52 arranges the selected virtual machine in the server 10 under the reference switch (operation S5). At this time, the candidate calculation unit 52 preferably arranges the selected virtual machine in the server 10 where the reference group is arranged. The candidate calculation unit 52 checks whether or not the virtual machine that is not arranged exists, and in a case where the arrangement of all the virtual machines is ended, the processing is ended (operation S6; No).

In a case where the virtual machine that is not arranged still exists, the candidate calculation unit 52 checks whether or not the maximum number of the virtual machines are already arranged in the server 10 connected to the reference switch (operation S7). In a case where the maximum number of virtual machines are already arranged, the candidate calculation unit 52 sets the switch the assigned number of which is higher than the assigned number of the current reference switch by 1 as a new reference switch (operation S7; Yes, operation S8). Herein, the candidate calculation unit 52 determines an error in a case where the number of the reference switch is higher than the maximum number of the switches connected to the server, and the processing is ended (operation S9; Yes, operation S10). On the other hand, in a case where the number of the reference switch is lower than or equal to the maximum number of the switches connected to the server, the candidate calculation unit 52 updates the reference group and repeatedly performs the processing in and after operation S2 (operation S9; No, operation S11). In operation S7, also in a case where the maximum number of virtual machines are not arranged, the candidate calculation unit 52 updates the reference group and repeatedly performs the processing in and after operation S2 (operation S7; No, operation S11).

[Monitoring on Operation Situation and Calculation for Movement Cost]

Figure 18:
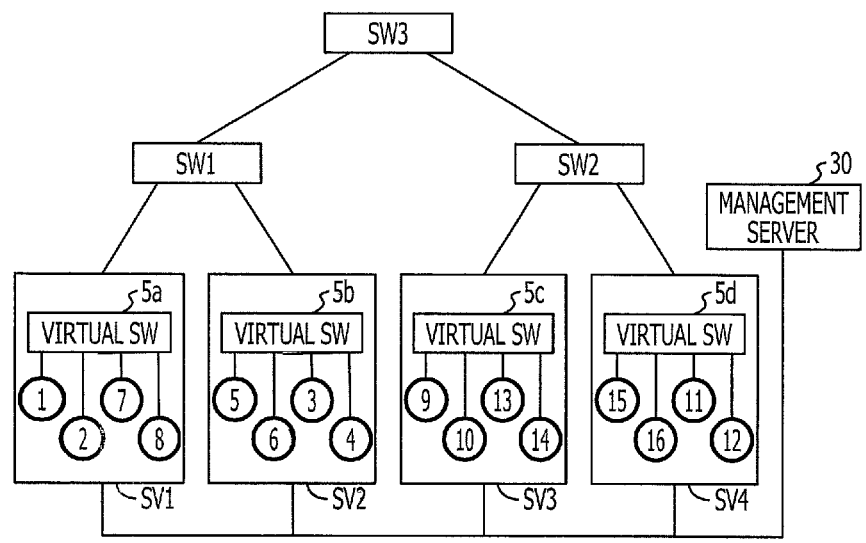
FIG. 18 illustrates an example of an arrangement of the virtual machines.

FIG. 18 illustrates an example of the arrangement of the virtual machines. Hereinafter, while a case in which the arrangement of the virtual machines in operation is as illustrated in FIG. 18 is taken as an example, an example of an operation carried out by the management server 30 to grasp a situation of the communication from the individual servers 10. In the example of FIG. 18, the arrangement of the virtual machines is as follows.

The virtual machines arranged in the server SV1: VM1, VM2, VM7, and VM8

The virtual machines arranged in the server SV2: VM3, VM4, VM5, and VM6

The virtual machines arranged in the server SV3: VM9, VM10, VM13, and VM14

The virtual machines arranged in the server SV4: VM11, VM12, VM15, and VM16

The virtual switches 5 (5a to 5d) obtains a communication band (X), an occurrence frequency of the communications (Y), an average duration of the communications (Z) for each combination of the data transmission source and the destination with regard to the communications carried out in the virtual machines connected to the virtual switch 5. Furthermore, the virtual switch 5 obtains a traffic amount (U) generated in a case where the virtual machine is moved to another server 10 with regard to the connected individual virtual machines. In the following description, the traffic amount generated in a case where the virtual machine is moved is referred to as "movement traffic amount" in some cases. The movement traffic amount is a memory amount occupied by the virtual machine and represents an amount of data moved in accordance with the movement of the virtual machines. It is noted that for the movement of the virtual machines, an arbitrary live migration technology may be used, and in accordance with the used live migration method, the virtual switch 5 calculates the movement traffic amount. Furthermore, the virtual switch 5 also predicts a continuance time (V) with regard to the individual virtual machines. A calculation method for the continuance time (V) is decided in accordance with the implementation. For example, the continuance time (V) is calculated as a time half of the average time of the communications in some cases.

In the example of FIG. 18, the virtual switch 5a obtains the communication carried out in each of the virtual machines VM1, VM2, VM7, and VM8, the movement traffic generated in a case where each of the virtual machines VM1, VM2, VM7, and VM8 is moved, and the like. Similarly, the virtual switch 5b obtains values related to the virtual machine VM3, VM4, VM5, and VM6 arranged in the server SV2, and the virtual switch 5c obtains values related to the virtual machines VM9, VM10, VM13, and VM14 arranged in the server SV3. Also, the virtual switch 5d obtains values related to the virtual machines VM11, VM12, VM15, and VM16 arranged in the server SV4. It is noted that the virtual switches 5 is set to observe a communication in which a destination address is set as a port of the gateway as a traffic to the external part.

FIG. 19A and FIG. 19B illustrate examples of a table held in the virtual switch 5a. The virtual switch 5 notifies the management server 30 of the traffic information such as the communication band, the occurrence frequency of the communications, and the average duration of the communications, the movement traffic of the virtual machines, and the information such as the continuance time.

FIG. 20 illustrates an example of a notification message used for the notification of the traffic information, the movement traffic of the virtual machines, and the information such as the continuance time. FIG. 20 illustrates an example of the message transmitted from the respective servers 10 to the management server 30 for the notification of the communication band (X). The notification message includes a destination address field, a transmission source address field, a data type field, a data number field, and a data field. A destination IP (Internet Protocol) address is an address of the management server 30, and a transmission source IP address is an address of the server 10 that transmits the message. In the following description, the IP address of the management server 30 is set as 192.168.1.1, and the IP address of the server SV1 is set as 192.168.1.100. In the data type field, information for identifying the information notified from the relevant message is recorded. In this example, since the notification of the communication band is conducted, X is recorded. It is noted that in a case where plural types of data are transmitted in a single message, the data type field can include information for identifying the type of transmitted and received data, the position where the data is recorded, and the like.

In the data number field, the number of pieces of data stored in the data field is recorded. In this example, eight pieces of data are included in the data field. The respective pieces of data are associated with an identifier of the virtual machine at the destination (DstVM) of the data and an identifier of the virtual machine at the transmission source (SrcVM) of the data. In this example, the identifiers of the virtual machine at the destination and the virtual machine at the transmission source are associated with a traffic (Mbps) of the data transmitted and received between the destination and the transmission source. For example, data #1 indicates that a band of 5 Mbps is used in the communication from the virtual machine VM2 to the virtual machine VM1. Furthermore, the virtual switch 5 may also transmit other information to the management server 30 by using a similar notification message.

When the notification message is received from the server 10, the reception unit 31 of the management server 30 outputs the notification message to the movement load calculation unit 40. The movement load calculation unit 40 checks a content of the data type field in the notification message. In a case where pieces of information related to the movement of the virtual machines such as the movement traffic of the virtual machines and the continuance time is included in the notification message, the movement load calculation unit 40 extracts those pieces of information to be stored while being associated with the identifier of the virtual machine.

In a case where information related to the respective communication such as the communication band is included among the notification message input from the reception unit 31, the movement load calculation unit 40 outputs the notification message to the correlation degree calculation unit 51 and the external traffic obtaining unit 53. The correlation degree calculation unit 51 obtains data related to the communication in which the transmission source and the destination are both the virtual machines in the data center among the data included in the notification message input from the movement load calculation unit 40. The correlation degree calculation unit 51 stores information related to the individual communications such as the communication band, the occurrence frequency of the communications, and the average duration of the communications while being associated with a combination of the transmission source and the destination in the individual communications. The external traffic obtaining unit 53 obtains data related to the communication in which any of the transmission source and the destination of the data is the external communication apparatus or the port of the gateway. The external traffic obtaining unit 53 records the obtained data in the external traffic amount table 55 while being associated with the virtual machine.

The check on the operational situation, the notification, and the like described herein are set to be carried out, for example, at a certain period of time such as every ten minutes or every one hour. It is noted that the frequency for the check on the operational situation is arbitrarily set in accordance with the processing load of the management server 30 or the server 10, the load on the network, or the like.

Next, the calculation for the movement cost will be described. The "movement cost" is a load imparting on the network with regard to a certain virtual machine when the live migration from the currently arranged server 10 to the other server 10 is carried out. A situation where the movement cost is high indicates that a burden attributable to the movement of the virtual machines is high. For example, the traffic amount used for moving the relevant virtual machine is high, and monetary costs incur. The movement load calculation unit 40 uses the information included in the notification message to calculate the movement cost Q with regard to the respective virtual machines from the following expression.

$$Q = d \times u + e \times v$$

Where d and e are coefficients and stored in the movement load calculation unit 40. Also, u denotes a movement traffic parameter, and v denotes a remaining time parameter. The movement traffic parameter (u) is a normalized value obtained by dividing a value of the movement traffic amount (bps) U generated in a case where the respective virtual machines are moved by a maximum value Umax of the movement traffic amount. That is, u=U/Umax is established, and u takes a value between 0 and 1. Also, v is a normalized value (v=V/Vmax) obtained by obtaining an average value V of the remaining times with regard to the individual virtual machines and dividing V by the obtained maximum value (Vmax). Therefore, v also takes a value between 0 and 1. Values of the coefficients d and e may be arbitrarily set by the operator in accordance with the implementation or based on the empirical rules so that an influence of the prioritized parameter is enhanced. For example, in a case where the correlation degree is obtained while an emphasis is placed on the influence caused by the band used for the live migration, d=1 and e=0 may be set. Also, the operator may set the respective parameters as values at which a scale of the influence imparting, for example, on a monetary value is reflected. It is noted that the parameter calculated by being multiplied by the coefficient having the value of 0 is not taken into account in the calculation for the movement cost. The movement load calculation unit 40 records the calculated movement cost in the movement cost table 41. FIG. 21 illustrates an example of the movement cost table 41.

[Recalculation for Arrangement Candidate and Change in Arrangement of Virtual Machines in Operation]

When the notification on the new operational situation is conducted through the notification message, the correlation degree calculation unit 51 recalculates the correlation degree based on the latest information. The calculation method for the correlation degree is the same as described above. The correlation degree calculation unit 51 updates the correlation degree table 54 by using the latest value of the correlation degree. In addition, when the movement load calculation unit 40 is also notified of the new data through the notification message, the movement cost is recalculated to update the movement cost table 41.

Hereinafter, the arrangement of the virtual machines in operation is as illustrated in FIG. 18, and an example of an operation carried out in a case where the latest correlation degree calculated from the communication situations between the virtual machines VM1 to VM16 is as illustrated in FIG. 10 will be described. That is, the correlation degree table 54 is updated as illustrated in FIG. 10. Also, the latest movement cost table 41 is illustrated in FIG. 21.

When the correlation degree table 54 is updated, the candidate calculation unit 52 calculates a new arrangement candidate. A calculation method for the arrangement candidate is similar to the method described in the procedures (1) to (8). It is however noted that in a case where the arrangement candidate is recalculated during the operation, since the virtual machines are already arranged unlike the case in which the arrangement candidate is calculated before the operation, the movement of the virtual machines occurs. In view of the above, before the virtual machines are arranged by using the calculated result, the management server 30 estimates a burden on the network caused by the communication generated for arranging the virtual machine in accordance with the arrangement candidate in the following procedure and decides an arrangement to be adopted.

(11) The candidate calculation unit 52 obtains all the arrangement candidates with which the efficiency of the network in the data center may be increased based on the calculated arrangement candidate and the network information 61. For example, it is assumed that the candidate calculation unit 52 calculates the arrangement candidate illustrated in FIG. 15 through the above-mentioned procedures (1) to (8). Then, the candidate calculation unit 52 checks whether or not the arrangement candidate equivalent to the calculated arrangement candidate exists from the network information 61 while the symmetric property of the network is taken into account. Herein, since the network in the data center is as illustrated in FIG. 7 and FIG. 8, even when the combination (arrangement group) of the arranged virtual machines is exchanged by the following three types of methods, the equivalent arrangement candidate can be obtained.

(a) Exchange of the server SV1 and the server SV2
(b) Exchange of the server SV3 and the server SV4
(c) Exchange of the combination of the server SV1 and the server SV2 and the combination of the server SV3 and the server SV4

Therefore, eight types corresponding to 2 cubed of the equivalent arrangement candidates are conceivable.

Figure 22A:
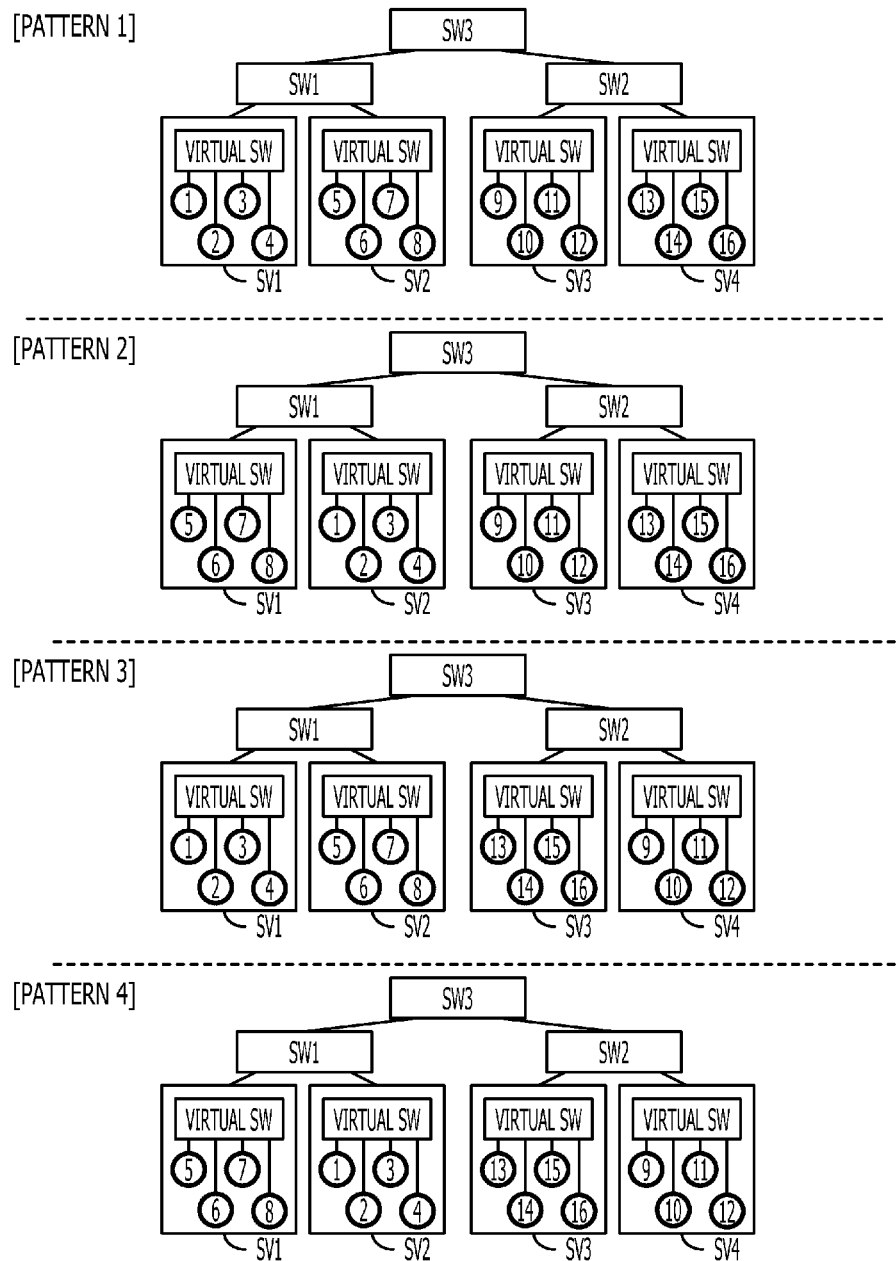

FIGS. 22A and 22B illustrate an example of the equivalent arrangement candidate. A pattern 1 in FIG. 22A is the calculation result illustrated in FIG. 15. In a pattern 2 in FIG. 22A, the combination of the virtual machines arranged in the server SV1 in the pattern 1 are arranged in the server SV2, and the combination of the virtual machines arranged in the server SV2 in the pattern 1 are arranged in the server SV1. In a pattern 3 in FIG. 22A, the combination of the virtual machines arranged in the server SV3 in the pattern 1 are arranged in the server SV4, and the combination of the virtual machines arranged in the server SV4 in the pattern 1 are arranged in the server SV3. In a pattern 4 in FIG. 22A, in the servers SV1 and SV2, the virtual machines are arranged similarly as in the pattern 2, and in the servers SV3 and SV4, the virtual machines are arranged similarly as in the pattern 3.

In a pattern 5 in FIG. 22B, the virtual machines arranged in the servers SV1 and SV2 in the pattern 1 are arranged in the servers SV3 and SV4, and the virtual machines arranged in the servers SV3 and SV4 in the pattern 1 are arranged in the servers SV1 and SV2. Similarly, in a pattern 6 in FIG. 22B, the virtual machines arranged in the servers SV1 and SV2 in the pattern 2 are arranged in the servers SV3 and SV4, and the virtual machines arranged in the servers SV3 and SV4 in the pattern 2 are arranged in the servers SV1 and SV2. In a pattern 7 in FIG. 22B, the virtual machines arranged in the servers SV1 and SV2 in the pattern 3 are arranged in the servers SV3 and SV4, and the virtual machines arranged in the servers SV3 and SV4 in the pattern 3 are arranged in the servers SV1 and SV2. In a pattern 8 in FIG. 22B, the virtual machines arranged in the servers SV1 and SV2 in the pattern 4 are arranged in the servers SV3 and SV4, and the virtual machines arranged in the servers SV3 and SV4 in the pattern 4 are arranged in the servers SV1 and SV2.

(12) The candidate calculation unit 52 outputs all the arrangement candidates obtained through the procedure (11) to the movement load calculation unit 40. The movement load calculation unit 40 compares the input respective arrangement candidates with the current arrangement to identify the virtual machines to be moved. Furthermore, the candidate calculation unit 52 obtains the total sum (total movement cost) of the movement costs obtained with respect to each of the virtual machines.

For example, in a case where the change is made from the arrangement illustrated in FIG. 18 to the pattern 1, the virtual machines to be moved are the virtual machines VM3, VM4, VM7, VM8, VM11, VM12, VM13, and VM14. In view of the above, the total movement cost in the case of the change from the arrangement illustrated in FIG. 18 to the pattern 1 is obtained as follows.

$$Q_{VM3}+Q_{VM4}+Q_{VM7}+Q_{VM8}+Q_{VM11}+Q_{VM12}+Q_{VM13}+Q_{VM14}=3+4+7+8+11+12+13+14=72$$

When the arrangement candidate is the pattern 2, the virtual machine to be moved are the virtual machines VM1, VM2, VM5, VM6, VM11, VM12, VM13, and VM14. In view of the above, the total movement cost in the case of the change from the arrangement illustrated in FIG. 18 to the pattern 2 is obtained as follows.

$$Q_{VM1}+Q_{VM2}+Q_{VM5}+Q_{VM6}+Q_{VM11}+Q_{VM12}+Q_{VM13}+Q_{VM14}=1+2+5+6+11+12+13+14=64$$

The candidate calculation unit 52 obtains the total movement cost with respect to the other pattern through a similar method.

FIG. 23 illustrates an example of the obtained values when the total movement cost is obtained which occurs upon the change from the arrangement illustrated in FIG. 18 to the patterns 1 to 8. In this example, the total movement cost is an index of the load imparting the network in the data center caused by the transmission and reception of the data generated accompanied by the movement of the virtual machines. Therefore, in this example, the total movement cost can be mentioned as the index of the movement load.

(13) When the total movement cost is calculated with respect to the respective arrangement candidates, the movement load calculation unit 40 recognizes a pattern in which the total movement cost is lowest. When the total movement cost of the arrangement candidate in which the total movement cost is lowest is lower than or equal to the previously stored movement threshold, the movement load calculation unit 40 decides the arrangement of the virtual machines in accordance with the arrangement candidate in which the total movement cost is lowest. In the example of FIG. 23, the total movement cost at the time of the pattern 2 is the lowest value. In view of the above, if the total movement cost at the time of the pattern 2 is lower than or equal to the movement threshold, the movement load calculation unit 40 arranges the virtual machines in accordance with the pattern 2. At this time, in a case where the movement threshold is 80, the total movement cost in the pattern 2=64 is lower than the movement threshold. In view of the above, the movement load calculation unit 40 decides the arrangement of the virtual machines as the arrangement illustrated in the pattern 2.

(14) The movement load calculation unit 40 transmits a movement instruction message for identifying the server 10 at the movement destination to the virtual machine the arrangement of which is changed. FIG. 24 illustrates an example of a format of the movement instruction message. The movement instruction message includes the destination address field, the transmission source address field, a movement virtual machine field, and a movement destination server field. In the destination address field, an address of the server 10 where the movement target virtual machine is arranged is recorded. In the transmission source address field, an address of the management server 30 is recorded. In the movement virtual machine field, an identifier allocated to the movement target virtual machine is recorded. In the movement destination server field, a number associated with the server 10 at the movement destination for the virtual machine identified by the identifier that is described in the movement virtual machine field is recorded. FIG. 24 illustrates an example of a message used when the virtual machine VM1 is moved from the server SV1 to the server SV2. The destination address is an address of the server SV1 (192.168.1.100), an identifier of the movement target virtual machine is VM1, and the server 10 at the movement destination is SV2. The movement load calculation unit 40 transmits a similar movement instruction message to the virtual machines VM2, VM5, VM6, VM11, VM12, VM13, and VM14 in addition to the virtual machine VM1 to move the virtual machines. As a result, the virtual machine VM are arranged as illustrated in the pattern 2 of FIG. 22A.

Figure 25:
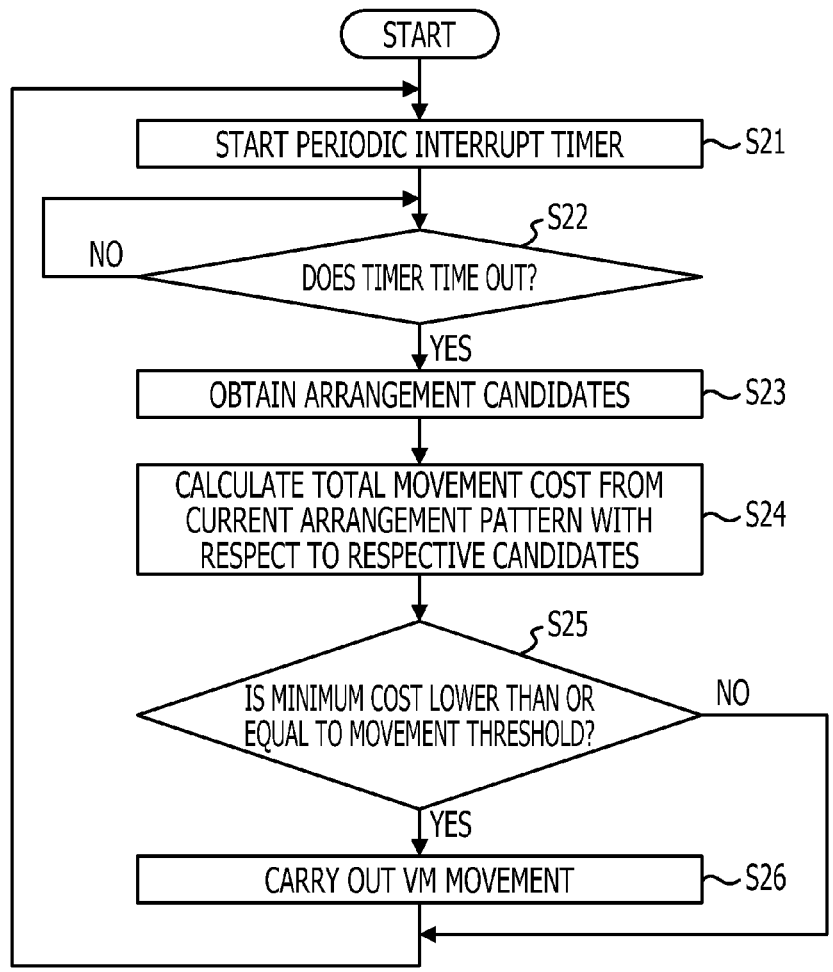
FIG. 25 is a flow chart for describing an example of an operation by the management server in operation in the data center.

FIG. 25 is a flow chart for describing an example of an operation by the management server 30 in operation in the data center. In the example of FIG. 25, the correlation degree calculation unit 51 is provided with a timer. The correlation degree calculation unit 51 starts a periodic interrupt timer and stands by until the timer times out (operations S21 and S22). The correlation degree calculation unit 51 updates the correlation degree table 54, and the candidate calculation unit 52 uses the updated correlation degree table 54 to obtain the arrangement candidates (operation S23). At this time, the candidate calculation unit 52 also checks the network information 61 and also obtains the equivalent arrangement candidate based on the symmetric property of the network. The movement load calculation unit 40 calculates the total movement cost in the case of the change from the current arrangement pattern with regard to each of the obtained arrangement candidates (operation S24). The movement load calculation unit 40 identifies a minimum value of the obtained total movement cost and checks whether or not the minimum value is lower than or equal to the movement threshold (operation S25). When the minimum value is lower than or equal to the movement threshold, the movement load calculation unit 40 performs the movement of the virtual machines (operation S25; Yes, operation S26). On the other hand, in a case where the minimum value is higher than the movement threshold, the processing in and after operation S21 is repeatedly carried out (operation S25; No). It is noted that FIG. 25 is an example, and a modification may also be adopted in which, for example, the movement of the virtual machines is carried out in a case where the minimum value is lower than the movement threshold in operation S25. Also, in the case of an asymmetric network, a single arrangement candidate is obtained in operation S23, and the total movement cost calculated with regard to the obtained arrangement candidate is compared with the movement threshold in operation S25.

As described above, by using the method according to the present embodiment, in a case where the total movement cost is lower than or equal to the movement threshold, the arrangement of the virtual machines are changed so that the lines in the data center are effectively utilized. Therefore, the efficiency of the communication in the data center is increased. Furthermore, since the arrangement of the virtual machines is not carried out in accordance with the arrangement candidate in which the total movement cost is higher than the movement threshold, a situation is avoided in which the communication in the data center is stressed because the processing of moving the virtual server is too heavy.

In this manner, in the data center using the method according to the present embodiment, the lines in the data center are effectively utilized, and as compared with the data center without using the method according to the present embodiment, it is possible to construct a data center using low specification devices. Also, as compared with the data center without using the method according to the present embodiment, the number of used devices can be reduced in some cases in the data center according to the present embodiment. Therefore, costs for designing and operating the data center are reduced.

Second Embodiment

According to a second embodiment, a description will be given of an example of a case in which while an emphasis is placed on the external traffic amount to decide the arrangement candidate in the asymmetric network. It is noted that according to the second embodiment too, the method of calculating the arrangement candidate and thereafter deciding whether the arrangement of the virtual machines is carried out in accordance with the arrangement candidate is similar to the first embodiment. Also, the calculation method for the movement cost and the monitoring method for the operational situation are similar to the first embodiment as well. It is noted that the virtual switches 5 is set to observe a communication in which the destination address is set as the port of the gateway as a traffic to the external part.

Figure 26:
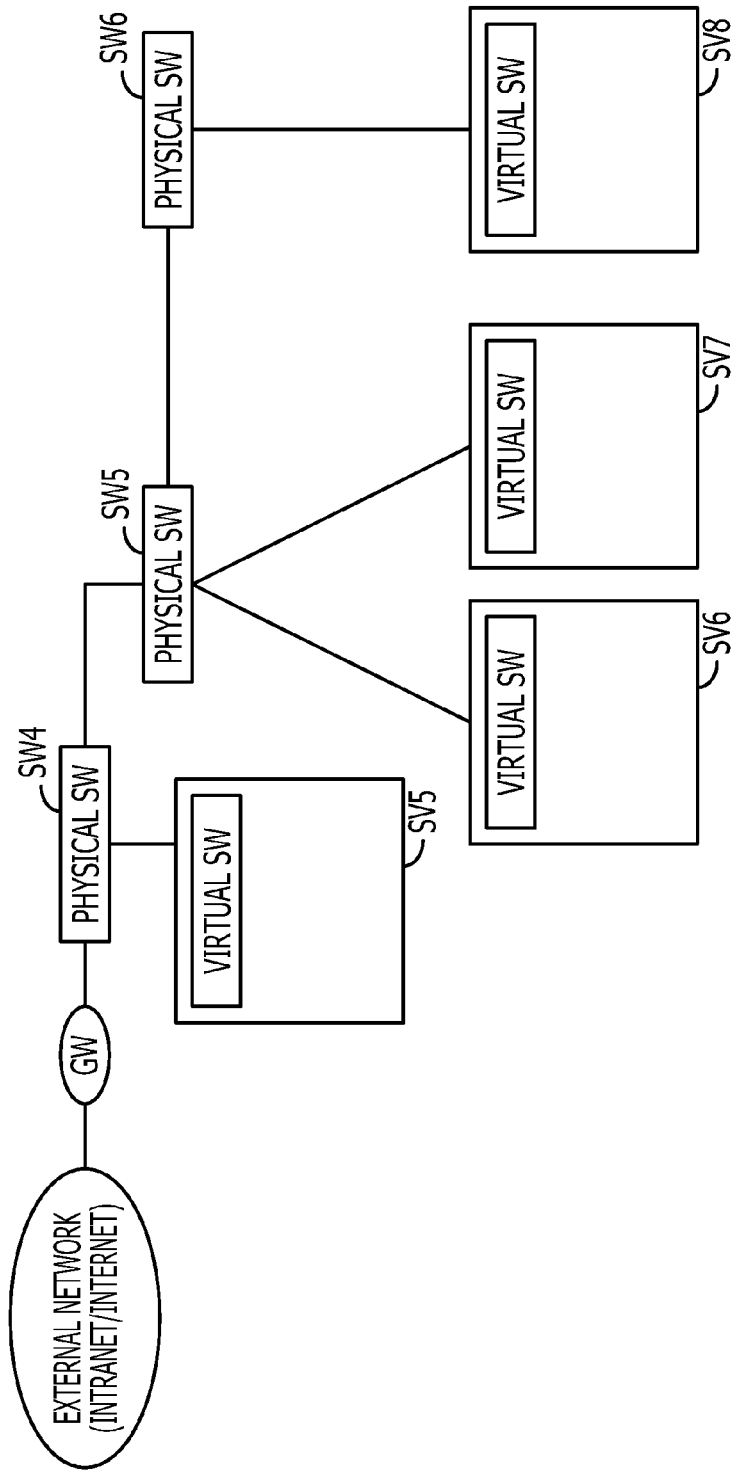
FIG. 26 illustrates an example of an asymmetric network.

FIG. 26 illustrates an example of the asymmetric network. The network in the data center is connected to the external network via the gateway. Herein, as an example of the external network, an intranet or the internet is exemplified. In the network illustrated in FIG. 26, four servers SV5 to SV8 are included. A switch SW4 is connected to the gateway and also connected to the server SV5. Therefore, the number of hops from the gateway to the server SV5 is 2. The servers SV6 and SV7 are connected to a switch SW5, the number of hops from the gateway is 3 for both the servers SV6 and SV7. The server SV8 is connected to a switch SW6 and connected to the gateway via the SW4 to SW6, and therefore the number of hops at a time when the gateway is set as a starting point is 4. Furthermore, it is set that up to four virtual machines can be arranged in any of the servers.

FIG. 27 illustrates an example of the external traffic amount of the virtual machines VM1 to VM16. According to the present embodiment, since the external traffic amount is used from a stage in which the arrangement of the virtual machines is decided before the operation, the data illustrated in FIG. 27 is included in the initial value data 62. It is noted that similarly as in the first embodiment, the initial value data 62 may record a value set through a calculation, a simplified experiment, or the like carried out by the operator. The candidate calculation unit 52 refers to the network information 61 and arranges the virtual machine having a high traffic to the external part of the data center in the server 10 having a small number of hops from the gateway. At this time, since the value of the external traffic is as illustrated in FIG. 27, the virtual machines VM13 to VM16 having a relatively high external traffic are arranged in the server SV5 (the number of hops is 2). On the other hand, the virtual machines VM1 to VM4 having a relatively low external traffic are arranged in the server SV8 (the number of hops is 4). The other virtual machines VM5 to VM12 are arranged in the server SV6 or SV7 (the number of hops is 3).

Figure 28:
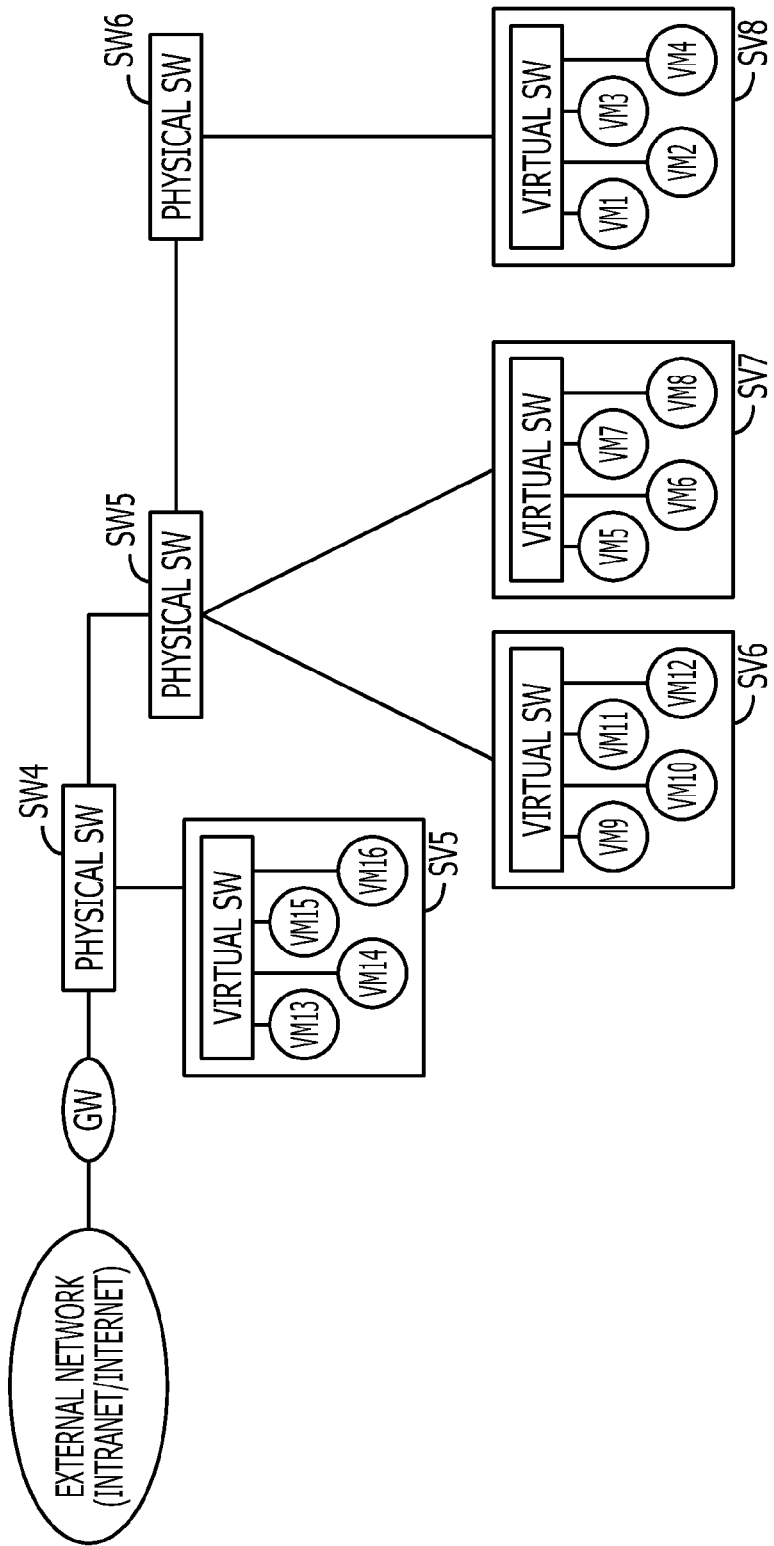
FIG. 28 illustrates an example of the arrangement of the virtual machines through a method according to a second embodiment.

FIG. 28 illustrates an example of the arrangement of the virtual machines through the method according to the second embodiment. It is noted that the gateway is placed on a highest layer of the network, and furthermore, in the network including the server 10 that is directly connected to the gateway, the virtual machine having the maximum external traffic amount is arranged in the server 10 that is directly connected to the gateway.

After the operation is started, through the method described according to the first embodiment, the external traffic obtaining unit 53 monitors the external traffic amount to update the external traffic amount table 55. After the operation is started, the candidate calculation unit 52 obtains the arrangement candidate based on the value of the external traffic amount table 55. When the total value of the movement cost in the case of the arrangement change to the arrangement candidate obtained by the candidate calculation unit 52 is lower than or equal to the movement threshold, the arrangement of the virtual machines is changed in accordance with the arrangement candidate.

According to the present embodiment, since the virtual machine having the higher external traffic amount is arranged in the server having the smaller number of hops from the gateway, the network within the data center is efficiently utilized. Furthermore, since whether or not the virtual machines are moved is decided based on the total movement cost, a congestion caused by the processing of moving the virtual server can be avoided.

Third Embodiment

According to the present embodiment, a description will be given of a method of reducing the power consumption in the data center by setting, in a case where the server 10 having no virtual machine arranged exists, the relevant server 10 to be in the power saving mode. It is noted that the method of arranging the virtual machines and the method of changing the arrangement of the virtual machines are similar to the methods described according to the first or second embodiment. It is noted that According to the present embodiment, the management server 30 is provided with the power saving location detection unit 33.

Figure 29:
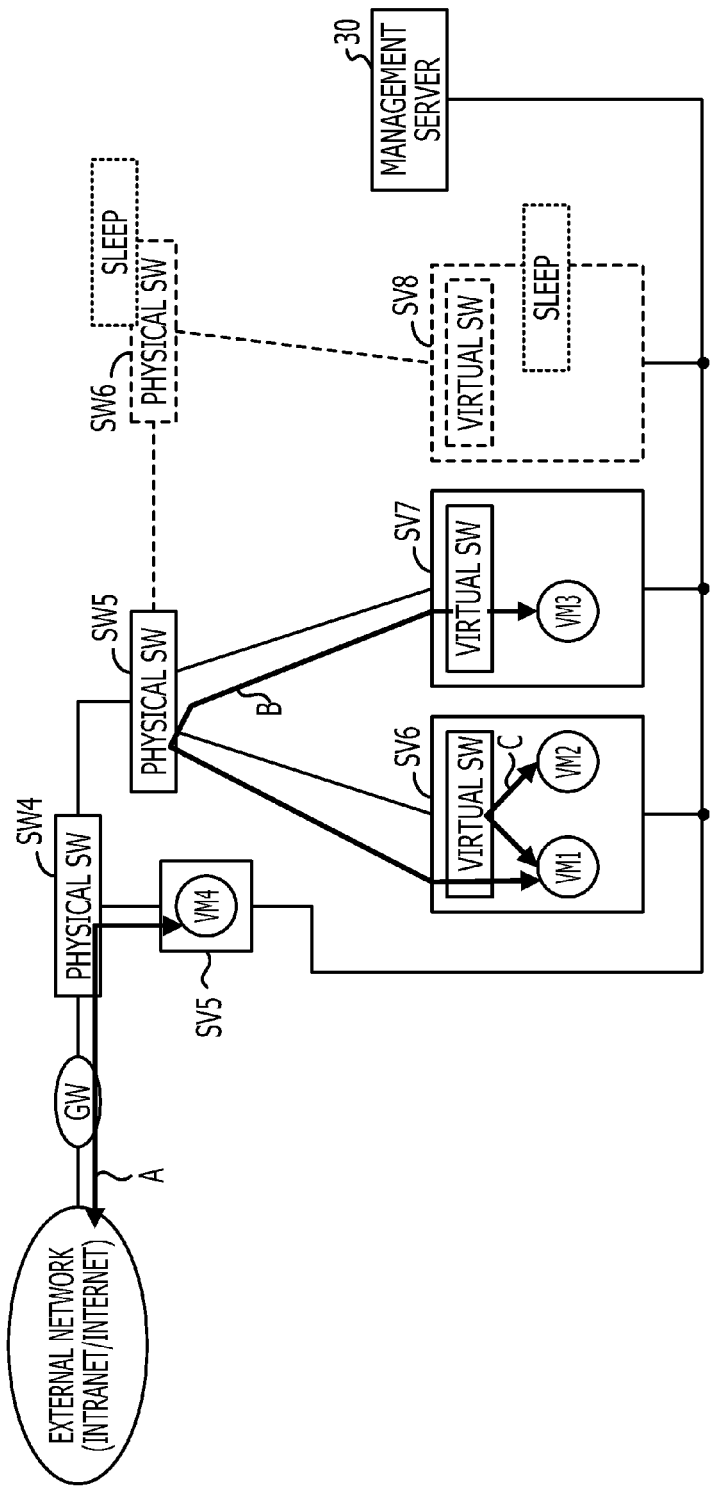
FIG. 29 illustrates an example of the arrangement of the virtual machines.

The virtual machines are arranged through the movement of the virtual machines as illustrated in FIG. 29. Also, herein, as indicated by arrows A to C, the following communications are conducted.

A: Communication between the virtual machine VM4 and the external communication apparatus B: Communication between the virtual machines VM1 and VM3

C: Communication between the virtual machines VM1 and VM2

The power saving location detection unit 33 accesses the movement load calculation unit 40, the correlation degree table 54, the external traffic amount table 55, the network information 61, and the like to identify a location where the communication is conducted. The power saving location detection unit 33 records the identified result in a link-by-link traffic table.

FIG. 30 illustrates an example of the link-by-link traffic table. The link-by-link traffic table is held by the power saving location detection unit 33. In the example of FIG. 30, a column represents an apparatus at an output source, and a row represents an apparatus at an input destination. In a cell where the column represents the apparatus at the output source and the row represents the apparatus at the input destination, whether or not the traffic is generated between the respective apparatuses is recorded. Herein, in a case where the traffic is generated, a value of the cell is set as 1, and in a case where the traffic is not generated, the value is set as 0 (in FIG. 30, a blank space for facilitating a visualization).

The power saving location detection unit 33 recognizes the communication generated between the virtual machine VM4 and the external communication apparatus from the external traffic amount table 55. Also, the power saving location detection unit 33 accesses the movement load calculation unit 40 to recognize that the virtual machine VM4 is arranged in the server SV5. In view of the above, by referring to the network information 61, the power saving location detection unit 33 recognizes that the data output from the switch SW4 is input to the server SV5 and the data output from the server SV5 is input to the switch SW4. In view of the above, the power saving location detection unit 33 sets the values of the cell (Out, In)=(the switch SW4, the server SV5) and the cell (Out, In)=(the server SV5, the switch SW4) among the stored table as 1. Furthermore, since the communication destination of the virtual machine VM4 is an external apparatus and the communication is also generated between the gateway and the switch SW4, the values of the cell (Out, In)=(the switch SW4, the gateway) and the cell (Out, In)=(the gateway, the switch SW4) are also set as 1. Similarly, as a result of processing all the traffics in FIG. 29, the link-by-link traffic table is as illustrated in FIG. 30.

The power saving location detection unit 33 checks whether or not the apparatus in which all the cells at the column and the row in the link-by-link traffic table are set as 0 exists. In the case of FIG. 30, in the switch SW6 and the server SV8, the values of all the cells at the column and the row are set as 0. Then, the power saving location detection unit 33 determines that the switch SW6 and the server SV8 are not used for the communication. Subsequently, the power saving location detection unit 33 transmits the power saving instruction message to the apparatuses identified as the unused apparatuses for the communication. FIG. 31 illustrates an example of a format of the power saving instruction message. The power saving instruction message illustrated in FIG. 31 is provided with the transmission source address field, the destination address field, and a request operation field. In the transmission source address field, an address of the management server 30 is recorded, and in the destination address field, an address of the apparatus identified by the power saving location detection unit 33 is recorded. It is noted that addresses of the individual apparatuses are previously recorded in the network information 61. The request operation field=1 means a setting instruction of the power saving mode, and the request operation field=0 means a cancellation instruction of the power saving mode. The power saving location detection unit 33 generates the power saving instruction message to be output to the transmission unit 32. The transmission unit 32 transmits the power saving instruction message to the destination.

When the power saving instruction message where the request operation field=1 is set is received, the respective apparatuses in the network are shifted into the power saving mode. On the other hand, when the power saving instruction message where the request operation field=0 is set is received, the respective apparatuses in the network cancels the power saving mode.

Figure 32:
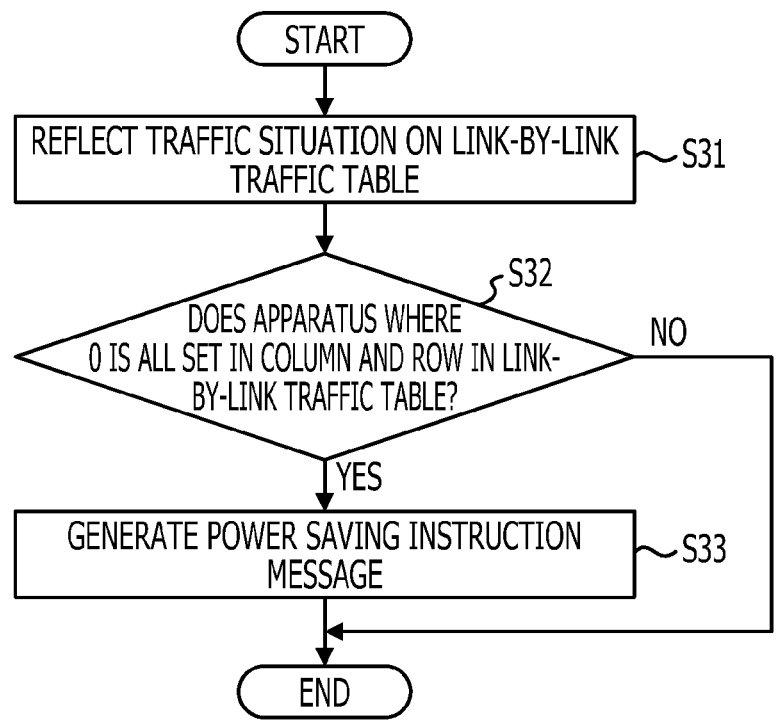
FIG. 32 is a flow chart for describing an example of an operation by a power saving location detection unit.

FIG. 32 is a flow chart for describing an example of an operation by the power saving location detection unit 33. The power saving location detection unit 33 reflects the situation of the traffic in the link-by-link traffic table (operation S31). The power saving location detection unit 33 checks whether or not the apparatus in which all the cells at the column and the row in the link-by-link traffic table are set as 0 exists (operation S32). In a case where the apparatus in which all the cells at the column and the row in the link-by-link traffic table are set as 0 does not exist, the power saving location detection unit 33 ends the processing (operation S32; No). In a case where the apparatus in which all the cells at the column and the row in the link-by-link traffic table are set as 0 can be identified, the power saving location detection unit 33 generates the power saving instruction message to be transmitted to the identified apparatus via the transmission unit 32 (operation S32; Yes, operation S33).

FIG. 33 is a flow chart for describing an example of an operation by the management server in operation in the data center. Operations S41 to S46 are similar to operations S21 to S26 described with reference to FIG. 25. The power saving location detection unit 33 checks whether or not the apparatus that does not contain the traffic exists (operation S47). In a case where the apparatus that does not contain the traffic can be identified, the management server 30 transmits the power saving instruction message to the identified apparatus (operation S47; Yes, operation S48). In a case where the apparatus that does not contain the traffic is not identified, the management server 30 repeatedly performs the processing in and after operation S41.

<Others>

It is noted that embodiments are not limited to the above-mentioned embodiments, and various modifications can be made. Hereinafter, some examples will be described.

For example, the calculation expressions for the correlation degree and the movement cost may be modified in accordance with the implementation. For example, modifications can be made such as the correlation degree $P=x \times y \times z$ and the movement cost $Q=u \times v$.

Also, the types of the information elements included in the above-mentioned table and the formats of the messages are examples and may be modified in accordance with the implementation.

The third embodiment is implemented in a combination with the first or second embodiment. Furthermore, the example in the asymmetric network has been described according to the third embodiment, but the method described according to the third embodiment may also be used in a symmetric network.

Also, according to the second embodiment, when the arrangement candidate is obtained, a modification may be made to use the external traffic amount and the correlation degree in a combined manner. For example, in a case where the plural servers 10 having the same number of hops from the gateway exist like the servers SV6 and SV7 of FIG. 28, the mutual virtual machines having the high correlation degree may preferably be arranged in the same server 10. For example, in the case of FIG. 28, the correlation degree calculation unit 51 may obtain the correlation degrees of the virtual machines VM5 to VM12 and arrange the virtual machines VM5 to VM12 in the servers SV6 and SV7 based on the obtained correlation degrees similarly as in the method described according to the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory; and
a processor that executes a program including a procedure on the memory, the procedure comprising:
receiving information in which a communication amount corresponding to an amount of transmitted and received data is associated with a transmission source and a destination of the data with respect to each of a plurality of virtual machines operating in a system including a plurality of servers, each of the plurality of servers being coupled with each other via a network;
calculating a correlation degree between the transmission source and the destination based on the information, the correlation degree being a numeric value representing an index of the communication amount between the virtual machines;

calculating an arrangement candidate of the virtual machine with respect to the server based on the correlation degree;
calculating a load on the network in the system imparted by the transmission and reception of the data attributable to a movement of the virtual machine to match the arrangement candidate; and
controlling the movement of the virtual machine in accordance with the arrangement candidate based on the load and a threshold.

2. The apparatus according to claim 1, wherein
the correlation degree is calculated in a manner that the correlation degree between the transmission source and the destination is set to be higher as the communication amount is higher.

3. The apparatus according to claim 1, wherein
the arrangement candidate is calculated in a manner that a combination of the virtual machines in which the correlation degree is relatively high is preferentially arranged in a same server.

4. The apparatus according to claim 1, wherein
in a case where the load is lower than at least the threshold, the movement of the virtual machine is controlled to generate a movement instruction message for instructing the virtual machine of a movement target about a server at a movement destination to form a same arrangement as the arrangement candidate.

5. The apparatus according to claim 1, wherein
in a case where the load is higher than at least the threshold, the movement of the virtual machine is controlled to decide that the arrangement of the plurality of virtual machines is not set to be the same arrangement as the arrangement candidate.

6. The apparatus according to claim 1, wherein
the controlling the movement of the virtual machine includes calculating, with regard to each of the virtual machines of the movement targets to form the same arrangement as the arrangement candidate, a movement cost generated by the movement of the virtual machines of the movement targets,
the load is a total sum of the movement costs, and
the movement cost is higher as the amount of data transmitted and received through the movement of the virtual machines and higher as a time during which the virtual machines of the movement targets remain is longer.

7. The apparatus according to claim 1, further comprising:
network information corresponding to information for identifying a connection between the plurality of mutual servers, wherein
the arrangement candidate is calculated in a manner that in a case where the network has a symmetric property, a first arrangement candidate and a second arrangement candidate equivalent to the first arrangement candidate are calculated, and
the movement of the virtual machine is controlled in a manner that
in a case where a first load calculated with regard to the first arrangement candidate is lower than a second load calculated with regard to the second arrangement candidate, the first load is compared with the threshold, and
in a case where the first load is lower than the threshold, it is decided that the plurality of virtual machines are arranged to form the same arrangement as the first arrangement candidate.

8. The apparatus according to claim 1, the procedure further comprising:
detecting a server in which the virtual machine is not arranged among the plurality of servers; and
transmitting a power saving instruction message for instructing to set a power saving mode to the detected server.

9. The apparatus according to claim 1, wherein
the correlation degree is calculated in a manner that a correlation degree between a first virtual machine and a second virtual machine
is set as a higher value as the amount of data transmitted and received in a communication between the first virtual machine and the second virtual machine is higher,
is set as a higher value as a frequency of the communications generated between the first virtual machine and the second virtual machine is higher, and
is set as a higher value as a duration of the communication generated between the first virtual machine and the second virtual machine is longer.

10. The apparatus according to claim 1, the procedure further comprising:
obtaining a traffic amount of data transmitted and received with an external communication apparatus located at an external part of the system with regard to each of the plurality of virtual machines; and
obtaining a first number of hops from a gateway apparatus that relays a communication with the external communication apparatus located at the external part of the system to a first server in the system and a second number of hops from the gateway apparatus to a second server in the system with regard to each of the plurality of servers, and
the arrangement candidate is calculated in a manner that in a case where the first number of hops is lower than the second number of hops, the virtual machine having the larger traffic amount is set to be arranged in the first server.

11. A method of managing a plurality of virtual machines operating in a system including a plurality of servers coupled via a network, the method comprising:
receiving information in which a communication amount corresponding to an amount of transmitted and received data is associated with a transmission source and a destination of the data with respect to each of the plurality of virtual machines;
calculating a correlation degree between the transmission source and the destination based on the information, the correlation degree being a numeric value representing an index of the communication amount between the virtual machines;
calculating an arrangement candidate of the virtual machine with respect to the server based on the correlation degree;
calculating a load on the network in the system imparted by the transmission and reception of the data attributable to a movement of the virtual machine to match the arrangement candidate; and
controlling, by a computer, the movement of the virtual machine in accordance with the arrangement candidate based on the load and a threshold.

12. The method according to claim 11, wherein
the correlation degree is calculated in a manner that the correlation degree between the transmission source and the destination is set to be higher as the communication amount is higher.

13. The method according to claim 11, wherein
the arrangement candidate is calculated in a manner that a combination of the virtual machines in which the correlation degree is relatively high is preferentially arranged in a same server.

14. The method according to claim 11, wherein
in a case where the load is lower than at least the threshold, the movement of the virtual machine is controlled to generate a movement instruction message for instructing the virtual machine of a movement target about a server at a movement destination to form a same arrangement as the arrangement candidate.

15. The method according to claim 11, wherein
in a case where the load is higher than at least the threshold, the movement of the virtual machine is controlled to decide that the arrangement of the plurality of virtual machines is not set to be the same arrangement as the arrangement candidate.

16. The method according to claim 11, wherein
the controlling the movement of the virtual machine includes calculating, with regard to each of the virtual machines of the movement targets to form the same arrangement as the arrangement candidate, a movement cost generated by the movement of the virtual machines of the movement targets,
the load is a total sum of the movement costs, and
the movement cost is higher as the amount of data transmitted and received through the movement of the virtual machines and higher as a time during which the virtual machines of the movement targets remain is longer.

17. The method according to claim 11, further comprising:
calculating, in a case where the network has a symmetric property, a first arrangement candidate and a second arrangement candidate equivalent to the first arrangement candidate, wherein
the movement of the virtual machine is controlled in a manner that
in a case where a first load calculated with regard to the first arrangement candidate is lower than a second load calculated with regard to the second arrangement candidate, the first load is compared with the threshold, and
in a case where the first load is lower than the threshold, it is decided that the plurality of virtual machines are arranged to form the same arrangement as the first arrangement candidate.

18. The method according to claim 11, wherein
the correlation degree is calculated in a manner that a correlation degree between a first virtual machine and a second virtual machine
is set as a higher value as the amount of data transmitted and received in a communication between the first virtual machine and the second virtual machine is higher,
is set as a higher value as a frequency of the communications generated between the first virtual machine and the second virtual machine is higher, and
is set as a higher value as a duration of the communication generated between the first virtual machine and the second virtual machine is longer.

19. The method according to claim 11, further comprising:
obtaining a traffic amount of data transmitted and received with an external communication apparatus located at an external part of the system with regard to each of the plurality of virtual machines; and
obtaining a first number of hops from a gateway apparatus that relays a communication with the external communication apparatus located at the external part of the system to a first server in the system and a second number of hops from the gateway apparatus to a second server in the system with regard to each of the plurality of servers, wherein
the arrangement candidate is calculated in a manner that in a case where the first number of hops is lower than the second number of hops, the virtual machine having the larger traffic amount is set to be arranged in the first server.

20. A non-transitory computer-readable recording medium having stored therein a program for causing an apparatus to execute a process, the process comprising:
receiving information in which a communication amount corresponding to an amount of transmitted and received data is associated with a transmission source and a destination of the data with respect to each of a plurality of virtual machines operating in a system including a plurality of servers coupled via a network;
calculating a correlation degree between the transmission source and the destination based on the information, the correlation degree being a numeric value representing an index of the communication amount between the virtual machines;
calculating an arrangement candidate of the virtual machine with respect to the server based on the correlation degree;
calculating a load on the network in the system imparted by the transmission and reception of the data attributable to a movement of the virtual machine to match the arrangement candidate; and
controlling the movement of the virtual machine in accordance with the arrangement candidate based on the load and a threshold.

* * * * *